United States Patent [19]
Iizuka

[11] Patent Number: 5,373,493
[45] Date of Patent: Dec. 13, 1994

[54] APPARATUS FOR DIGITALLY RECORDING REPRODUCING AND EDITING AN AUDIO SIGNAL

[75] Inventor: Nobuo Iizuka, Tokyo, Japan

[73] Assignee: Casio Computer Co., Ltd., Tokyo, Japan

[21] Appl. No.: 988,823

[22] Filed: Dec. 10, 1992

[30] Foreign Application Priority Data

Dec. 27, 1991 [JP] Japan ................... 3-346885

[51] Int. Cl.⁵ .............................................. G11B 7/00
[52] U.S. Cl. ...................................... 369/124; 369/48; 369/54; 360/32
[58] Field of Search .................. 369/13, 47–48, 369/53–54, 58–59, 60, 111, 124, 32; 360/32, 48

[56] References Cited

U.S. PATENT DOCUMENTS

| | | | |
|---|---|---|---|
| 4,433,415 | 2/1984 | Kojima | 360/32 X |
| 4,772,959 | 9/1988 | Amano et al. | 360/32 X |
| 4,939,595 | 7/1990 | Yoshimoto et al. | 360/19.1 |
| 5,050,013 | 9/1991 | Holsinger | 369/47 X |
| 5,099,464 | 3/1992 | Maeda | 369/47 X |
| 5,105,412 | 4/1992 | Yoshio | 369/48 |
| 5,224,087 | 6/1993 | Maeda et al. | 369/47 X |

OTHER PUBLICATIONS

JAS Journal, Apr., 1989; pp. 16–22.

*Primary Examiner*—W. R. Young
*Attorney, Agent, or Firm*—Frishauf, Holtz, Goodman & Woodward

[57] ABSTRACT

In a digital recorder, a signal process can be performed on digital audio data track by track or event by event in a recording mode or in a reproducing mode. In the recording/reproducing mode, transfer of digital audio data between a hard disk and respective audio input/output devices is executed in real time under control of a DMA controller and a HD controller. A DSP provided between the DMA controller and the HD controller performs the signal process such as a filtering process on digital audio data (block data) of several samplings in a lump, which are transferred (DMA transfer) in a lump between the buffer and the hard disk.

16 Claims, 16 Drawing Sheets

FIG.13

ORIGINAL RECORDING DATA

| | 1 | 2 | 3 | 4 | 5 |
|---|---|---|---|---|---|
| name | Track1 | Track2-1 | Track2-2 | Track3 | intro_a |
| Id | 00 | 00 | 01 | 01 | 00 |
| adr3 | 00000000 | 00100000 | 00000000 | 00090000 | 00000412 |
| vol | 00100000 | 00070000 | 00090000 | 00100000 | 00009f49 |

| 6 | 7 | 8 | 9 | 10 | --- | 20 | --- |
|---|---|---|---|---|---|---|---|
| take_1 | SE_a | fill_in | Melo_A | SE_1 | --- | Event X | --- |
| 00 | 00 | 01 | 01 | 01 | --- | 01 | --- |
| 00094B35 | 000f3b24 | 00053245 | 00009000 | 000ABCDE | --- | 00000A34 | --- |
| 00002340 | 00007000 | 00009675 | 00010000 | 0000460F | --- | 00002305 | --- |

FIG.14

|   | 0 | 1 | 2 |
|---|---|---|---|
| TRACK 1 | 1-00 | 0 |  |
| TRACK 2 | 2-00 | 3-00 | 0 |
| TRACK 3 | 4-00 | 0 |  |

↗ ↑ ↖
EVENT NUMBER / FILTER TYPE / LEVEL

FIG.15

|   | 0 | 1 | ... | 9 | 10 | 11 |
|---|---|---|---|---|---|---|
| TRACK 1 | 21-0F | 27-20 |  | 6-00 | 0 |  |
| TRACK 2 | 7-31 | 21-00 |  | 18-1F | 11-00 | 0 |
| TRACK 3 | 22-10 | 25-01 |  | 19-00 | 24-30 | 0 |

FIG.16

|  | TRACK 1 | TRACK 2 | TRACK 3 |
|---|---|---|---|
| EST INDEX | 1 | 3 | 2 |
| AMOUNT OF TRANSFERRED DATA | 00008600 | 00005400 | 00001600 |

APPARATUS FOR DIGITALLY RECORDING REPRODUCING AND EDITING AN AUDIO SIGNAL

BACKGROUND OF THE INVENTION

1. Field of the Invention

The present invention relates to a digital recorder which is capable of recording, reproducing and editing an audio signal in a digital fashion.

2. Description of the Related Art

For recording, reproducing and editing an audio signal, a method has been conventionally used, of recording an analog audio signal on a magnetic tape, reproducing the same from the magnetic tape and editing the recorded signal. Since the prior art involves an analog recording and reproducing process, deterioration of the sound quality is inevitable. Particularly, deterioration is prominent when the once-recorded audio signal is dubbed.

The use of the magnetic tape as a recording medium raises other problems that it takes time to reach a target editing point on the magnetic tape, and editing requires that a target recorded portion of the magnetic tape be physically cut and pasted or be copied to somewhere else before executing the editing.

The problem about the deterioration of the sound quality can be overcome by employing a method of digitally recording data on a magnetic tape. However, there still remains a shortcoming concerning the freedom of locating the starting point or editing due to the use of a sequential-access type recording medium.

Recently, there have been proposed solutions to the conventional problems which use a hard disk or a magneto-optical disk as a memory medium for disk-recording a digital signal such as the above mentioned audio signal, a video signal or a musical instrument digital interface (MIDI) signal.

For example, the following U.S. Patent applications have proposed several solutions to these conventional problems:

U.S. Ser. No. 07/690,710 filed Apr. 24, 1991, abandoned Inventor: Nobuo IIZUKA;

U.S. Ser. No. 07/752,876 filed Aug. 30, 1991, pending Inventor: Atsushi MIYAKE;

U.S. Ser. No. 07/795,983 filed Nov. 22, 1991, abandoned Inventor: Nobuo IIZUKA;

U.S. Ser. No. 07/807,053 filed Dec. 12, 1991, abandoned Inventor: Nobuo IIZUKA;

U.S. Ser. No. 07/850,682 filed Mar. 10, 1992, U.S. Pat. No. 5,303,218 Inventor: Atsushi MIYAKE;

U.S. Ser. No. 07/850,684 filed Mar. 10, 1992, pending Inventor: Atsushi MIYAKE;

U.S. Ser. No. 07/871,241 filed Apr. 20, 1992, pending Inventors: Nobuo IIZUKA and Hajime MANABE; and U.S. Ser. No. 07/965,180 filed Oct. 23, 1992, pending Inventor: Nobuo IIZUKA.

Such digital recorders using memory medium of a random access type can take advantage of such memory device for random-access editing and reproducing recorded digital audio data which is expressed in predetermined data blocks (hereafter called as events) for reproduction.

During recording or reproducing an audio signal, a signal process such as a filtering process is often executed on the audio signal. Further, in the above digital recorder which is capable of editing and reproducing events with use of the above hard disk, it is sometimes required to subject the audio signal expressed in the unit of events to a signal process.

Methods for processing a signal will be considered, such as a process for directly rewriting digital audio data of target events, and a process for processing digital audio data of the target events stored in an area of the memory device (for example, a hard disk) and then storing the resultant data again in other area of the memory device. However, the former process involves such a disadvantage as reserves no original digital audio data while the latter process has a disadvantage that requires much more memory areas because the processed digital audio data must be stored in a memory area other than the memory area where the digital audio data are originally stored.

To solve these disadvantages, a method will be considered which designates, in the editing process of the events, only contents of the signal process to be effected on the digital audio data, and effects the designated contents of the signal process on the original digital audio data, outputting the resultant data.

Recently, digital signal processors (DSP) are in use which are capable of effecting the above signal processing in real time. As a conventional recorder which is capable of processing a signal in a reproducing mode and further in a recording mode, a digital recorder will be considered, in which the DSP is disposed directly before a D/A convertor and directly after an A/D convertor, and which effects a digital signal process on the digital audio data just before D/A conversion or just after A/D conversion.

When the above conventional recorder is applied to a digital recorder in which digital audio data of multiple systems (tracks) are recorded and reproduced simultaneously, there will be possibility of necessity for effecting a different relevant signal process on data of every track. To take countermeasure to meet the above necessity, one DSP must be prepared for each track in the recorder. Even if an arrangement in which one DSP is used in a time sharing manner should be employed in the recorder, different sample of previous digital audio data for every track must be reserved and these samples of previous digital audio data must be controlled to be switched for the signal process, for example, in a digital filtering process in which previous data is used for a signal process. Furthermore, it can be required that a different relevant signal process is effected on a signal of every track. For example, events of the track 1 are subjected to a low pass filtering process, events of the track 2 to a band pass filtering process and events of the track 3 to a sound volume control process. Therefore, control data for effecting a different relevant signal process on a signal of every track must be selectively controlled.

As described above, conventional recorders involve problems that enlargement in a scale of hardware or complicated control of signal processes is inevitable, resulting in increase in manufacturing cost of the digital recorder or in lowered signal processing capacity.

SUMMARY OF THE INVENTION

The present invention has been made to solve the above-mentioned conventional problems, and has an object to provide a digital recorder which comprises:

audio input/output means for executing input/output operation of digital audio data;

audio storing means for storing digital audio data;

buffer means for successively and temporality storing digital audio data which are input to and/or output from said audio input/output means at predetermined sampling intervals;

transfer control means for executing data transfer of the digital audio data between said buffer means and said audio input/output means in synchronism with the predetermined sampling intervals, and for executing data transfer of the digital audio data of several continuous samplings in a lump between said buffer means and said audio storing means while the data transfer between said buffer means and said audio input/output means is not being executed; and signal processing means, provided on a pass for transferring the digital audio data between said buffer means and said audio storing means, for performing a digital signal process on the digital audio data of several continuous samplings in a lump which are transferred by said transfer control means between said buffer means and said audio storing means.

As the above audio input/output means may be used an A/D convertor or a D/A convertor which executes input/output operation of a digital audio data, or a convertor which executes selectively D/A conversion and A/D conversion.

A hard disk device, a magneto-optical memory disk device and an optical disk device of a random accessible type may be used as the above audio storing means.

The above transfer control means may include DMA control means, and the signal processing means may include a digital signal processor (DSP).

The signal processing means performs a digital signal process, such as a filtering process and a data compression/expansion process, on digital audio data of several samplings in a lump.

With above structure of the digital recorder, the signal processing means may perform a signal process as the filtering process on the digital audio data for several samplings in a lump which is transferred between the buffer means and the audio storing means.

The signal processing means may execute a signal process with use of only the digital audio data of several samplings which are to be transferred in a lump every transfer timing. Therefore, the signal processing means is not required to reserve, for example, the last transferred digital audio data.

When the digital audio data for several samplings are transferred from the audio storing means to the buffer means; in a reproducing mode and the signal processing means executes an FIR (Finite Impulse Response) filtering process which requires a previously transferred digital audio data, the transfer control means may easily deal with the matter by supplying the signal processing means with digital audio data of the number which is larger than the actual sampling number by the number of required previous or past digital audio data.

According to other aspect of the invention, there is provided a digital recorder which comprises:

a plurality of audio input/output means for executing audio input/output operation of digital audio signals corresponding to a plurality of tracks;

audio storing means for storing the digital audio data corresponding to the plurality of tracks;

a plurality of buffer means for successively and temporality storing digital audio data track by track which are input to and/or output from said plurality of audio input/output means at predetermined sampling intervals;

transfer control means for executing data transfer of the digital audio data track by track between said plurality of buffer means and said plurality of audio input/output means in synchronism with the predetermined sampling intervals, and for executing data transfer of the digital audio data of several continuous samplings in a lump track by track between said plurality of buffer means and said audio storing means while the data transfer between said plurality of buffer means and said plurality of audio input/output means are not being executed; and signal processing means, provided on passes for transferring the digital audio data between said plurality of buffer means and said audio storing means, for performing a digital signal process on the digital audio data of several continuous samplings in a lump track by track which are transferred by said transfer control means between said plurality of buffer means and said audio storing means.

A multi-track digital recorder is capable of executing a signal process on a signal of each track separately. In the multi-track digital recorder, the signal processing means is not required to reserve the past digital audio data for every track, and may execute the signal process with use of only the digital audio data of several samplings which are to be transferred in a lump every transfer timing.

The present invention may be applied not only to a digital audio recorder with recording and reproducing functions but also to an apparatus with a reproducing function.

As an embodiment of the above apparatus, there is provided an apparatus which comprises:

audio output means for outputting digital audio data;

audio storing means for storing digital audio data;

buffer means for successively and temporality storing digital audio data which are output to said audio output means at predetermined sampling intervals;

transfer control means for executing data transfer of the digital audio data between said buffer means and said audio output means in synchronism with the predetermined sampling intervals, and for executing data transfer of the digital audio data of several continuous samplings in a lump between said buffer means and said audio storing means while the data transfer between said buffer means and said audio output means is not being executed; and signal processing means, provided on a pass for transferring the digital audio data between said buffer means and said audio storing means, for performing a digital signal process on the digital audio data of several continuous samplings in a lump which are transferred by said transfer control means between said buffer means and said audio storing means.

In a recorder according to the present invention, contents of the signal processing may be selectively changed for every event in a recording mode or in a reproducing mode. According to another aspect of the invention, there is provided a digital recorder which comprises:

audio input/output means for executing input/output operation of digital audio data;

audio storing means for storing digital audio data;

event defining means for dividing digital audio data stored in said audio storing means into a plurality of events, and designating a digital signal process to be performed on each of the events;

buffer means for successively and temporality storing digital audio data which are input to and/or output from said audio input/output means at predetermined sampling intervals;

transfer control means for executing data transfer of the digital audio data between said buffer means and said audio input/output means in synchronism with the predetermined sampling intervals, and for executing data transfer of the digital audio data of several continuous samplings in a lump between said buffer means and said audio storing means while the data transfer between said buffer means and said audio input/output means is not being executed; and signal processing means, provided on a pass for transferring the digital audio data between said buffer means and said audio storing means, for performing digital signal processes designated for the respective events by said event defining means on the digital audio data of several continuous samplings in a lump which are transferred by said transfer control means between said buffer means; and said audio storing means.

According to still another aspect of the present invention, there is provided an apparatus which comprises:
 audio output means for outputting digital audio data;
 audio storing means for storing digital audio data;
 event defining means for dividing digital audio data stored in said audio storing means into a plurality of events, and designating a digital signal process to be performed on each of the events;
 buffer means for successively and temporality storing digital audio data which are output to said audio output means at predetermined sampling intervals;
 transfer control means for executing data transfer of the digital audio data between said buffer means and said audio output means in synchronism with the predetermined sampling intervals, and for executing data transfer of the digital audio data of several continuous samplings in a lump between said buffer means and said audio storing means while the data transfer between said buffer means and said audio output means is not being executed; and
 signal processing means, provided on a pass for transferring the digital audio data between said buffer means and said audio storing means, for performing digital signal processes designated for the respective events by said event defining means on the digital audio data of several continuous samplings in a lump which are transferred by said transfer control means between said buffer means and said audio storing means.

With the above structure of the apparatus, if data of one event are set to be transferred in a lump between the audio storing means and the buffer means, and signal processes to be performed by the signal processing means are set at the start of data transfer of respective events, there is no need to set respective signal processes in a complex time sharing manner.

As described above, the structure of the signal processing means is made simple and the signal processing means is controlled in a simple manner to perform signal processes. As a result, an apparatus of low cost may be realized which is capable of signal-processing with an editing function of a high degree of freedom.

It would be apparent to those skilled in the art from the following description of preferred embodiments that the present invention may be modified in various manners and may be applicable to other apparatus.

BRIEF DESCRIPTION OF THE DRAWINGS

Other objects and structures of the present invention will be more fully understood from the description, when taken in conjunction with the accompanying drawings, in which:

FIG. 13 is a view illustrating an example of an event table;

FIG. 14 is a view illustrating an example of an event sequence table of original recording data;

FIG. 15 is a view illustrating an example of an event sequence defined by a user;

FIG. 16 is a view showing an example of current data;

DETAILED DESCRIPTION OF THE PREFERRED EMBODIMENTS

Now, preferred embodiments of the digital recorder according to the present invention will be described with reference to the accompanying drawings.

Figure 1:
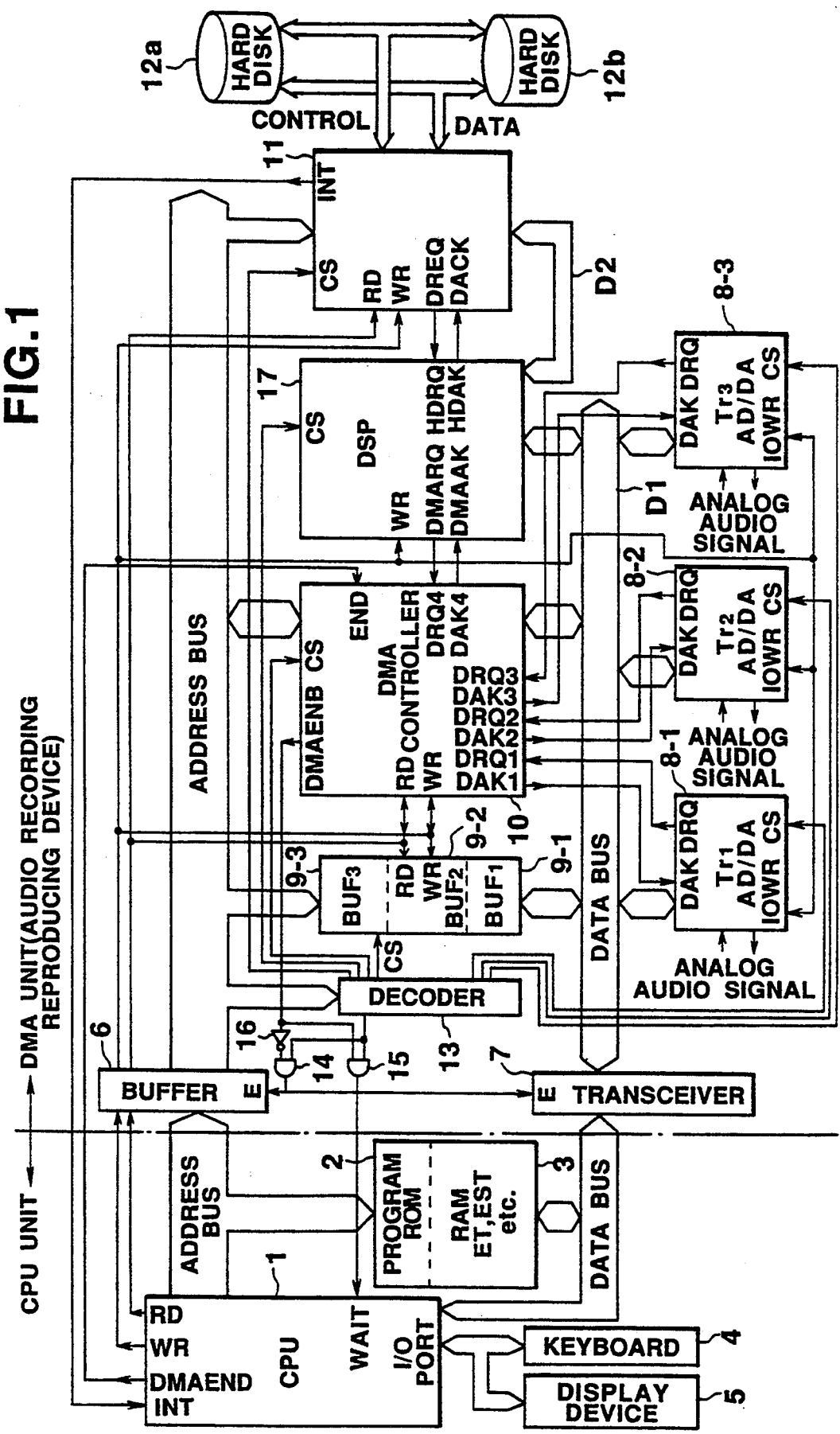
FIG. 1 is a block diagram of an embodiment of a digital recorder according to the present invention.

FIG. 1 is a view showing the whole structure of the embodiment of the digital recorder according to the present invention, which is capable of performing a recording and reproducing operation simultaneously with respect to up to three tracks, and in which a volume level controlling process and a filtering process can be designated with respect to every event of every track in a reproducing mode or in a recording mode. The whole structure is composed of a CPU section (a left side portion of the structure of FIG. 1) and a DMA unit (an audio recording and reproducing process apparatus, a right side portion of the structure of FIG. 1), as shown in FIG. 1. The DMA unit is characterized by a digital signal processor (DSP) included therein for processing a signal.

The CPU section comprises a CPU 1, a program ROM 2 which stores a program (to be described in detail later) for specifying operation of the CPU 1, a RAM 3 for storing various data, a keyboard 4 and a display device 5. The RAM 3 includes an area for storing various data, an area for storing access pointers of three tracks, an area for storing an event table (ET), an area for storing an event sequence table (EST) and a work area. Digital audio data stored in hard disks 12a and 12b is manually or automatically divided into a plurality of data (events). The event table (ET) includes identifying data (an event title) for identifying the divided audio data (events) and memory location (a disk ID, a leading address and an event length). The event sequence table (EST) includes the identifying data of events included in the event table (ET), types of filtering operations and signal levels, which are arranged for each track in an order of reproduction of the events. The keyboard 4 and the display device 5 are peripheral devices connected to an I/O port of the CPU 1. The keyboard 4 includes various function keys and data input keys while the display device 5 includes a cathode ray tube (CRT) display device or a liquid crystal display (LCD) device for displaying various indications.

As will be described later, the CPU 1, in a real-time operation mode such as in a recording/reproducing mode, controls individual components in the DMA unit at need while an address bus and a data bus D1 in the DMA unit are not busy. Further, the CPU 1 re-arranges data block and operates a disk access pointer in an editing mode. The recording/reproducing mode for each track (hereafter, referred to as "Tr") can be set by the keyboard 4, and further a starting point, a stopping point, a locating point and an editing point can be designated by the keyboard 4, as will be described later. An address signal is sent from the CPU 1 through the address bus to address terminals of the program ROM 2 and RAM 3, which have output terminals connected to the CPU 1 or a transceiver 7 through the data bus.

A buffer 6 and the transceiver 7 are provided in the DMA unit to connect the CPU section with the DMA unit. The buffer 6 is connected to the CPU 1 via the address bus, and to an address bus in the DMA unit. The transceiver 7 is connected to the CPU 1 via the data bus and to the data bus D1 in the DMA unit.

Provided in the DMA unit are an audio input/output device 8-1 for Tr 1, an audio input/output device 8-2 for Tr 2 and an audio input/output device 8-3 for Tr 3, which will independently receive or output an analog audio signal.

The audio input/output devices 8-1 to 8-3 each include a converter for selectively executing A/D or D/A conversion, a low pass filter for eliminating sampling noises and a clock circuit for generating a clock signal at sampling intervals. When a track is set to the recording mode, the relevant audio input/output device filters an analog audio signal supplied from the outside every sampling period, and executes A/D conversion on the signal, obtaining digital audio data. When the track is set to the reproducing (playing) mode, the relevant audio input/output device subjects the relevant digital audio data which has been read out in advance to D/A conversion every sampling intervals, and then properly filters the data, outputting an analog audio signal.

The audio input/output devices 8-1 to 8-3 for Tr 1 to Tr 3 are connected via the data bus D1 to buffers 9-1 (BUF 1), 9-2 (BUF 2) and 9-3 (BUF 3) respectively, for exchanging digital audio data therewith.

The buffers 9-1 to 9-3 correspond to Tr 1 to Tr 3, respectively, and exchange data with the audio input/output devices 8-1 to 8-3 respectively through direct memory accessing method (DMA) under control of a DMA controller 10.

When, in the recording mode, the DMA controller 10 is requested by the audio input/output devices 8-1 to 8-3 for DMA transfer (single transfer) of digital audio data which is associated with one sampling from the audio input/output devices 8-1 to 8-3 to the buffers 9-1 to 9-3, that is, when the DMA controller 10 receives a signal DRQ 1 for Tr 1, a signal DRQ 2 for Tr 2 and a signal DRQ 3 for Tr 3 (the respective audio input/output devices 8-1 to 8-3 output signals DRQ, requesting for DMA transfer), the DMA controller 10 sends back an acknowledge signal to the audio input/output devices 8-1 to 8-3, that is, the DMA controller 10 sends back a signal DAK 1 for Tr 1, DAK 2 for Tr 2 and DAK 3 for Tr 3 (the respective audio input/output devices 8-1 to 8-3 receive the acknowledge signal as DAC signal). Then, the DMA controller 10 will actually execute DMA transfer. In the playing mode, the audio input/output devices 8-1 to 8-3 request the DMA controller 10 for the DMA transfer (single transfer) of digital data associated with one sampling from the buffers 9-1 to 9-3 to the audio input/output devices 8-1 to 8-3 at the sampling intervals. Then, the DMA controller 10 will execute DMA transfer, similarly.

The buffers 9-1 to 9-3 each have a memory capacity which will store digital audio data of one and more samplings, and are arranged to function as FIFO buffers. For example, the RAM is divided into three portions for Tr 1 to Tr3, and each portion is used as a ring buffer (a buffer whose ending address and leading address are imaginarily linked together) which has a function of a FIFO buffer.

The buffers 9-1 to 9-3 are addressed through the address bus by the DMA controller 10. In other words, while the DMA transfer is being executed, the DMA controller 10 will occupy the address bus, the data bus D1 and a control signal line in the DMA unit.

The buffers 9-1 to 9-3 exchange data with the hard disks 12a and 12b through the data bus D 1 and D 2 including the signal processing of the DSP 17 under control of the DSP 17 and a hard disk controller (hereafter, referred to as "HD controller") 11. The hard disks 12a and 12b are connected with the HD controller 11 through the data bus and the control signal line. The HD controller 11 controls every read/write access to the hard disks 12a and 12b.

The present embodiment is characterized in that the DSP 17 is provided between the HD controller 11 and the buffers 9-1 to 9-3. The DSP 17 is a circuit which serves to execute data transfer while performing a digital signal process, when DMA transfer of digital audio data is executed between the buffers 9-1 to 9-3 and the hard disks 12a, 12b. More specifically, in the playing mode the DSP 17 subjects block data from the hard disks 12a, 12b to filtering operation at need, and stores the filtered block data in the buffers 9-1 to 9-3 while in the recording mode the DSP 17 subjects the block data stored in the buffers 9-1 to 9-3 to the filtering operation at need, and stores the filtered block data in the hard disks 12a, 12b. In the present embodiment, a filter process and level of FIR may be designated.

The hard disks 12a and 12b each have three separate memory areas for the respective tracks Tr 1 to Tr 3. The DMA controller 10 serves to execute the data transfer between the hard disks 12a, 12b and the buffers 9-1 to 9-3. That is, the HD controller 11 sends an interrupt signal (INT) to the CPU 1 after the data transfer of one data block has been finished, and further sends the CPU 1 an instruction to transfer the following data block, and then the DMA controller 10 is allowed to execute the data transfer. Upon receipt of the interrupt signal INT from the HD controller 11, the CPU 1 sets the DMA controller 10, the DSP 17 and the HD controller 11 to the desired mode, or performs programming thereof, and then allows the DMA transfer to be executed. A detailed description of the data-transfer operation will be given later.

In the playing mode, the DMA controller 10 reads out a predetermined amount (corresponding to the amount of data of several samplings) of digital audio data from the hard disks 12a and 12b, and causes the DSP 17 to perform filtering operation on the data in accordance with a setting condition while allowing the DMA transfer (block transfer) to be executed to a designated buffer among the buffers 9-1 to 9-3. In the recording mode, the DMA controller 10 reads out a predetermined amount (corresponding to the amount of data of several samplings) of digital audio data from the designated buffer, and then causes the DSP 17 to perform the filtering operation on the data in accordance with a setting condition while allowing the DMA transfer (block transfer) to be executed to specified positions on the hard disks 12a and 12b. Request signals DRQ 4, DMARQ, HDRQ, DREQ, and acknowledge signals DAK 4, DMAAK, HDAK, DACK among the DMA controller 10, the DSP 17 and the HD controller 11 will be described later.

The DMA controller 10 performs a time-sharing data-transfer on four channels: data transfer on three channels between the audio input/output devices 8-1 to 8-3 of Tr 1 to Tr 3 and the buffers 9-1 to 9-3 (three channels CH 1 to CH 3, as will be described later) and data transfer on one channel between the hard disks 12a, 12b, the DSP 17 and any buffer alternatively selected from among the buffers 9-1 to 9-3 (one channel CH 4 as will be described later, too).

CPU 1 supplies an address signal to the buffer 6 via the address bus to control the functions and operations of the individual components in the DMA unit. The CPU 1 further supplies designating signals CS for designating the components through the buffer 6 to a decoder 13, and then sends the relevant designating signals CS to the audio input/output devices 8-1 to 8-3, the buffers 9-1 to 9-3, the DMA controller 10, the DSP 17 and the HD controller 11. At the same time, CPU 1 exchanges various data with these components through the transceiver 7 via the data bus.

Further, the CPU 1 sends a designating signal WR, which designates whether the audio input/output devices 8-1 to 8-3 should be set to the recording mode (a write mode) or the playing mode (a read mode), through the buffer 6 to IOWR terminals of the audio input/output devices 8-1 to 8-3 and the DSP 17. It is decided by the designating signal WR whether the respective audio input/output devices 8-1 to 8-3 should perform A/D conversion on an input audio signal or D/A conversion on an output audio signal. Further, it is decided by the designating signal WR, to which the DMA controller 10 or the HD controller 11 the DSP 17 should output data, or from which the DMA controller 10 or the HD controller 11 the DSP 17 should receive data.

The CPU 1 sends the designating signal (a write signal) WR and another designating signal (a read signal) RD to the buffers 9-1 to 9-3, the DMA controller 10 and the HD controller 11 through the buffer 6, for reading data from or writing data in these components. The DMA controller 10 also outputs these signals RD and WR in DMA transfer mode. The relationship among these signals and the functions and operations of the components will be described later.

The DMA controller 10 sets a DMA enabling signal DMAENB to "1" and outputs the signal while the DMA transfer is being executed among the components. As a result, an output of a gate circuit 14 to which the signal DMAENB is supplied through an inverter 16 becomes "0". An enabling signal E is sent as "0" to the buffer 6 and the transceiver 7, disabling the CPU section and the DMA unit to exchange data and addresses with each other. When a signal of "1" has been supplied to an AND gate 15 from the decoder 13 in this case, the output of the gate 15 will be "1", allowing a wait signal WAIT to be supplied to the CPU 1.

If DMA transfer should start while the CPU 1 is sending a predetermined signal to the decoder 13 to enable the buffer 6 and the transceiver 7 in order to control the DMA unit, i.e., while the CPU 1 is sending a signal of "1" from the decoder 13 to one of the input terminals of the AND gate 14 (when the CPU 1 outputs an address signal for accessing anyone of the buffers 9-1 to 9-3, the DMA controller 10, the HD controller 11 and the audio input/output devices 8-1 to 8-3, the output of the decoder 13 becomes active, sending the output signal of "1" to one input terminal of each of the AND gates 14 and 15), the CPU 1 receives the signal WAIT, executing the DMA transfer by priority over other operations. After the DMA transfer is completed, the WAIT is released the CPU 1 to start the operation again.

Even if the CPU 1 tries to access the DMA controller 10 while the DMA controller 10 is executing the DMA transfer, the signal WAIT is sent from the AND gate 15 to the CPU 1, and the execution cycle of the CPU 1 is made longer to disable the buffer 6 and the transceiver 7 during this period.

In short, the CPU 1 can access the components in the DMA unit merely under the following two conditions:

(1) when the CPU 1 outputs an address to access individual components in the DMA unit, and (2) when signal DMAENB is inactive ("0"), i.e., when the data bus in the DMA unit is not busy.

The CPU 1, however, can continue processing without considering when to access the DMA unit in accordance with the action of gates 14 and 15.

To alter the operation state of the DMA unit immediately in response to a key input or the triggering by the control data, the CPU 1 can send a command DMA-END to the DMA controller 10 to stop DMA transfer what ever state the controller 10 is in (the command is sent as an END signal to the DMA controller 10).

Structure of Essential Portions of DMA Controller 10

One example of the structure of the DMA controller 10 will now be explained. The DMA controller 10 can transfer data in a bus cycle of several hundred nanoseconds. Therefore, it takes one to two microseconds to transfer sampling data for three tracks.

With a sampling frequency fs of 48 KHz, one sampling period will be approximately 21 microseconds. It is possible to assign most of the sampling period to the time for data transfer among the buffers 9-1 to 9-3, the HD controller 11, the DSP 17 and the hard disks 12a, 12b, the time for the DSP 17 to perform filtering operation and the time for the CPU 1 to program the individual components.

Figure 2:
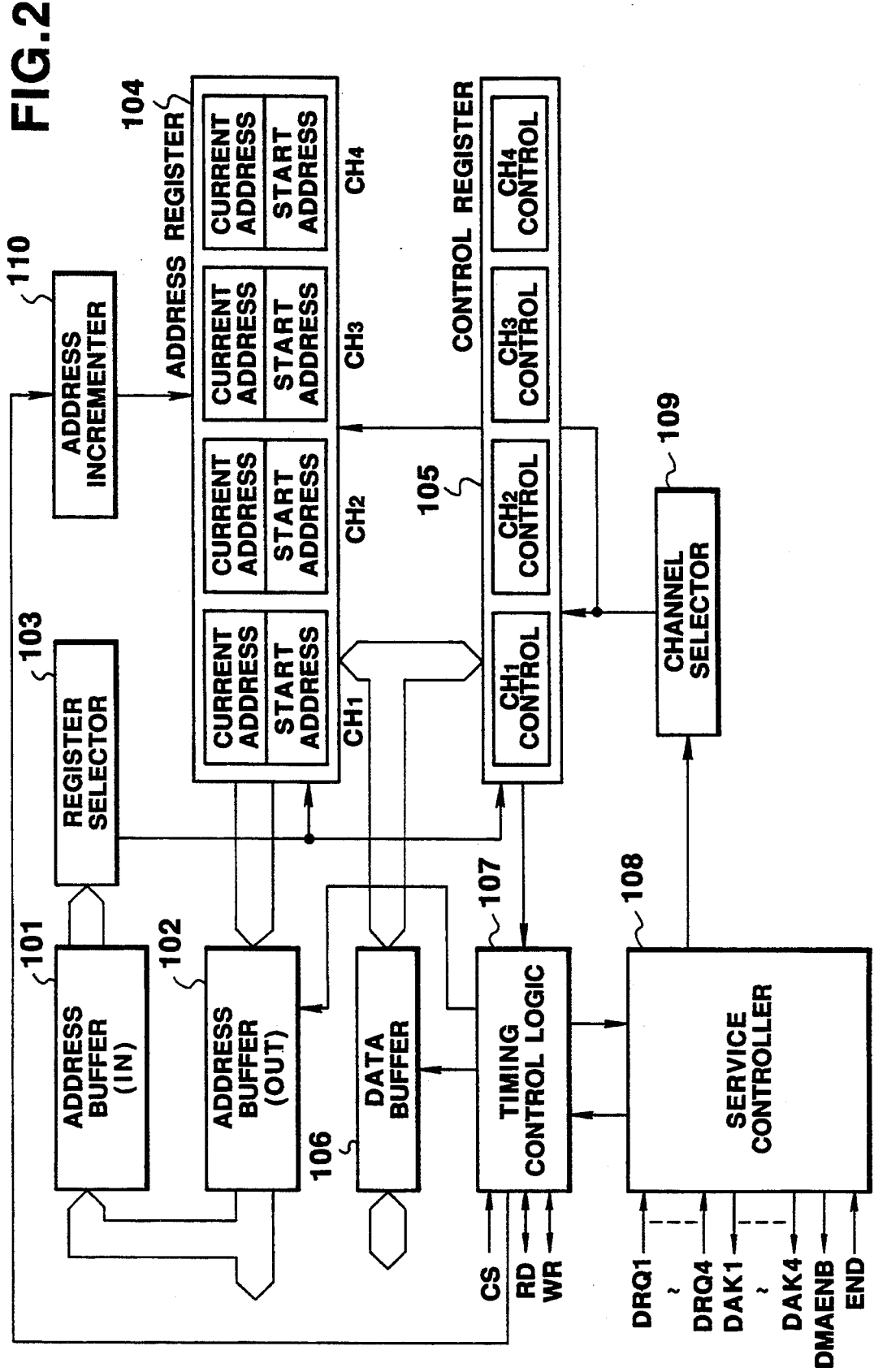
FIG. 2 is a block diagram of a main portion of DMA controller 10 of FIG. 1.

The structure of the essential portions of the DMA controller 10 is exemplified in FIG. 2. The DMA controller 10 has an address buffer 101 on its input side (IN) to be connected to the address bus and an address buffer 102 on its output side (OUT). In accordance with the address signal supplied to the address buffer 101 on the input side, what is designated by the a register selector 103 is changed to designate desired registers in an address register 104 and a control register 105.

The address register 104 and the control register 105 have areas for four channels CH1 to CH 4, respectively. The channels CH1 to CH3 are registers for executing the DMA transfer between the buffers 9-1 to 9-3 and the audio input/output devices 8-1 to 8-3, and the channel CH4 is a register for executing the DMA transfer between the hard disks 12a, 12b, the DSP 17 and the designated buffer among the buffers 9-1 to 9-3.

The registers in the channels CH1 to CH4 of the address register 104 each have a memory area for storing at least current addresses and start addresses of the corresponding buffer 9-1, 9-2 or 9-3 and a designated buffer. The individual areas in channels CH1 to CH4 of the control register 105 store control data for designating the direction of DMA transfer.

The contents of the address register 104 and the control register 105 are allowed to be input from and output to the data bus through a data buffer 106. A timing control logic 107, a service controller 108 and a channel selector 109 control these components.

The service controller 108 is of a hard logic type or of a micro program control type. The service controller 108 receives a signal from the timing control logic 107, the DMA request signals DRQ 1 to DRQ 4 from the audio input/output devices 8-1 to 8-3 and the DSP 17, and further receives a DMA interrupt command (DMAEND) from the CPU 1, and outputs response (acknowledge) signals DAK 1 to DAK 4 to the above components and a DMA enabling signal DMAENB indicating that DMA transfer is on. Further, the service controller 108 outputs various commands to the timing control logic 107, and a channel selecting signal to the channel selector 109. The channel selector 109 selectively designates registers corresponding to the individual channels CH1 to CH4 in the control register 105.

The timing control logic 107 receives a designating signal CS from the decoder 13, a control signal from the control register 105 and a control signal from the service controller 108, and controls input/output operations of the address buffer 102 and the data buffer 106. Further, the timing control logic 107 enables an address incrementer 110 to increment the current address register of The designated channel in the address register 104, and to reset the current address register to a start address of the buffer assigned to the designated channel when the current address register reaches the final address assigned to the channel.

Functional Structure of DSP 17

One example of the functional structure of the DSP 17 will be described with reference to FIG. 3.

References 3-1 and 3-3 stand for an input port switching unit and an output port unit, respectively, both of which serve as a selector unit for deciding a direction of the signal processing. Selected states are switched depending on the recording mode (in which data are stored from the buffers 9-1 to 9-3 to the hard disks 12a, 12b) or the reproducing mode (in which data are stored from the hard disks 12a, 12b to the buffers 9-1 to 9-3). In FIG. 3, a connection shown by real lines illustrates a recording mode direction, in which the data bus D 1 (see FIG. 1) is connected with the input side of a filter unit 3-2 while the data bus D 2 (see FIG. 2) is connected with the output side of the filter unit 3-2. A connection shown by broken lines illustrates a reproducing mode direction, in which the data bus D 2 is connected with the input side of the filter unit 3-2 while the data bus D 1 is connected with the output side of the filter unit 3-2.

The filter unit 3-2 is programmed by the CPU 1 (see FIG. 1) and perform filtering operation on input digital audio data before DMA transfer (block transfer) of the digital audio data is executed. The filter unit 3-2 judges from the signal WR input through the buffer 6 from the CUP 1 that data on the data bus D 1 is program data from the CPU 1. During DMA transfer (block transfer), the filter unit 3-2 executes a filtering process on one digital audio data which is input every transfer cycle, and at the end of the transfer cycle, the filter unit 3-2 outputs and stores one output in its output port (not shown).

Figure 4:
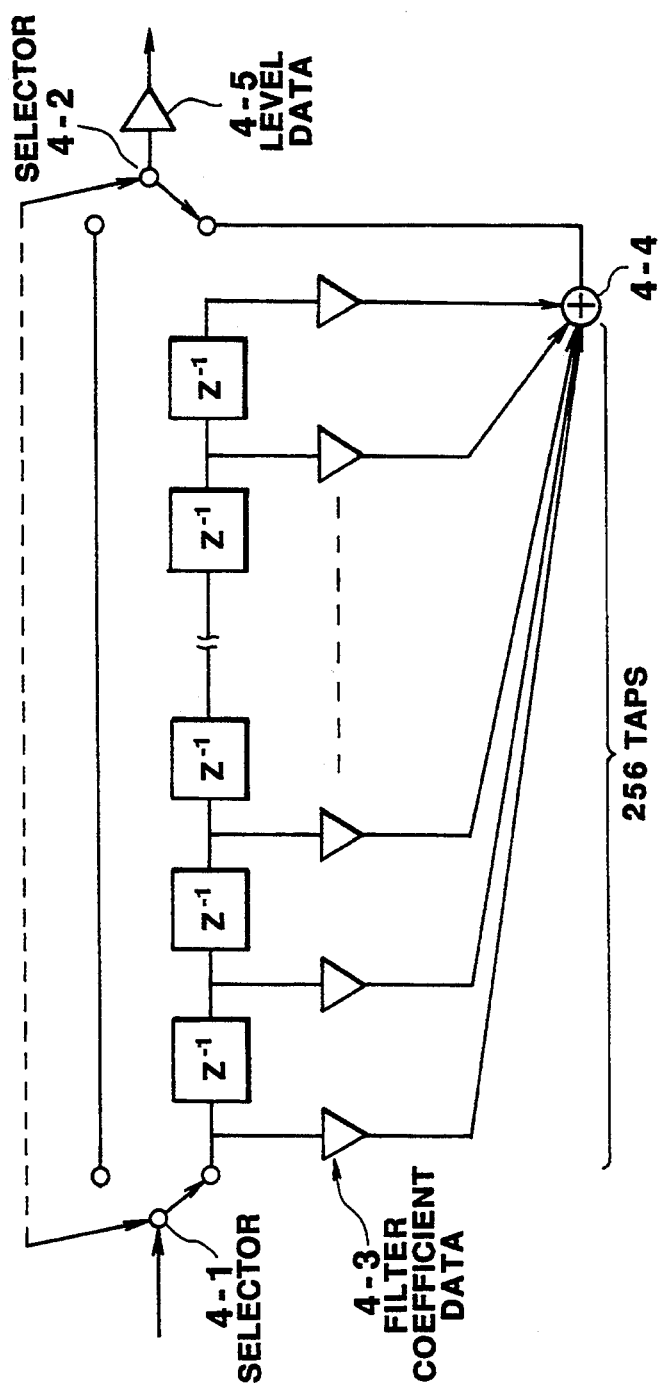
FIG. 4 is a view illustrating functions of a filter unit 3-2 of FIG. 3.

The internal structure of the filter unit 3-2 is schematically shown in FIG. 4. The filter unit 3-2 in the present embodiment is a filter of 256 taps, which executes FIR filtering process on one digital audio data input every one transfer cycle, based on the data and 255 past data which are successively delayed by series connection of 255 units of one-sample delay elements $Z^{-1}$. In FIG. 4, there are provided 256 units of multipliers 4-3, but 256 units of multipliers are not always needed. Instead of a plurality of multipliers, one multiplier may be used when it is operated at short cycles in a time sharing manner.

What are programmed by the CPU 1 (FIG. 1) are filter coefficient data to be supplied to selectors 4-1, 4-2 and respective multipliers 4-3 and level data to be supplied to a multiplier 4-5. The selectors 4-1, 4-2 decide whether or not a digital filtering process is executed. In the present embodiment, any of data sets of filter coefficient data of three types of filter processes: a low pass filter process of the 256th power, a band pass filter process and a high pass filter process is selected, or specified, as respective filter coefficient data to be supplied to the multiplier 4-3.

The filter unit 3-2 of the 256th power (256 taps) is used by the reason as follows: In the present embodiment, one sector of the hard disks 12a, 12b is of 512 bytes, and DMA transfer (block transfer) between the hard disks 12a, 12b and the buffers 9-1 to 9-3 is executed in the unit of sectors. If one sample (word) of the digital audio data is of 2 bytes, DMA transfer of such digital audio data will be executed in the unit of data blocks of multiple of 256 bytes. Accordingly, when the filter unit 3-2 of 256 taps is used, and the digital audio data for one sector (for 256 taps) is input from a sector number for DMA transfer to the filter unit 3-2, a sample number of output data blocks will be an intended number. A digital filter of 256 taps is used in the present embodiment because of such easiness in controlling.

Since a signal processing speed of the DSP 17 is sufficiently compared with a sampling speed of the digital audio data in the present embodiment, a time required by the filter unit 3-2 to execute the filtering process is several hundred nanoseconds. The presence of the DSP 17 gives scarcely effect to the capacity of data transfer between the hard disks 12a, 12b and the buffers 9-1 to 9-3.

Figure 3:
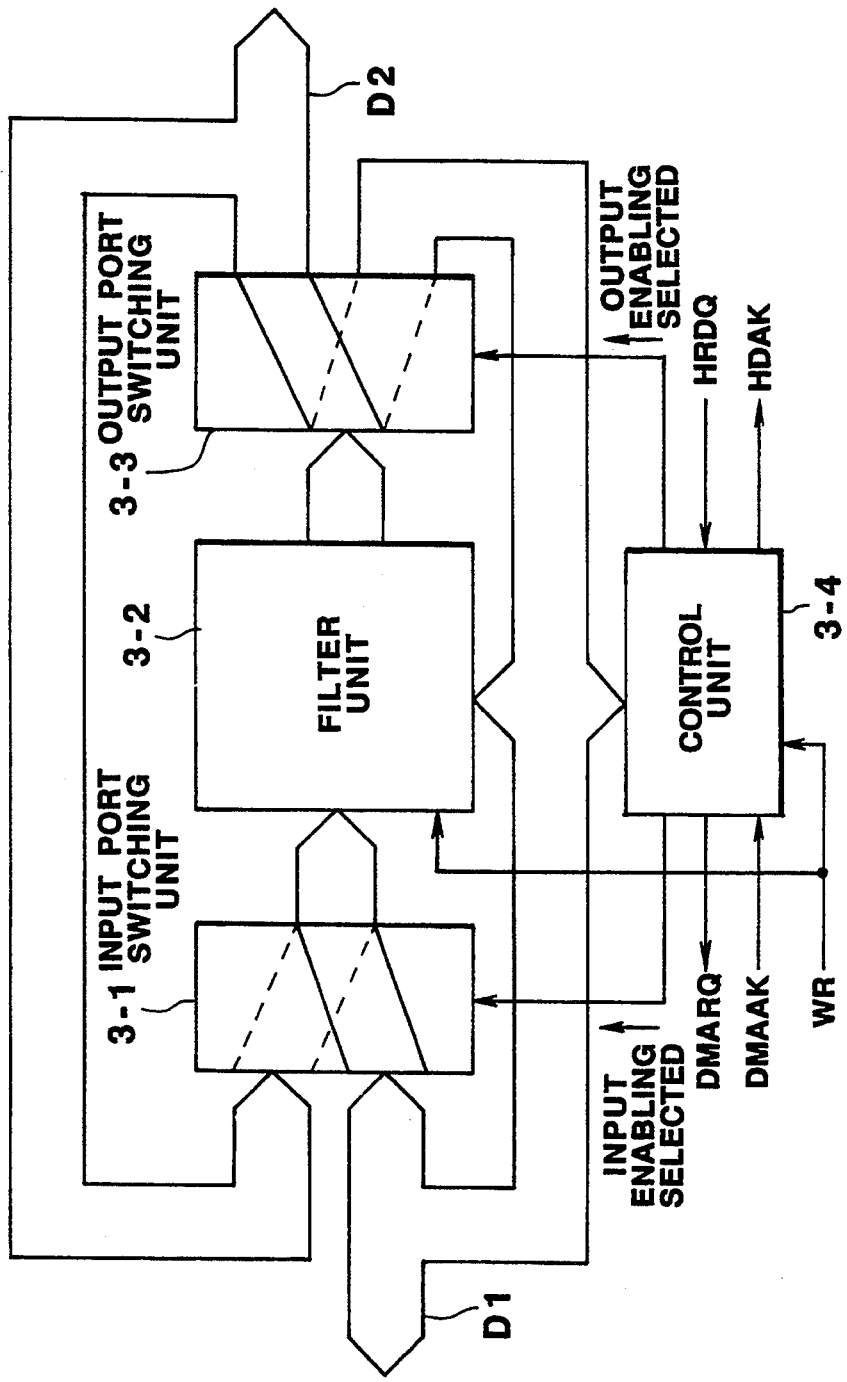
FIG. 3 is a view illustrating functions of DSP 17 of FIG. 1.

Referring to FIG. 3, the control unit 3-4 controls the entire operation of the DSP 17, and is programmed by the CPU 1 (see FIG. 1) before DMA transfer (block transfer), similarly to the filter unit 3-2. The control unit 3-4 is arranged not to generate any output before all the taps are filled to meet causality of the digital filter. Timing signals between the DMA controller 10 and the HD controller 11 are controlled depending on the direction of the data transfer which is decided in accordance with the recording mode or the reproducing mode. Though a detailed description of the timing control will be given later, a flow of signals among the DMA controller 10, the DSP 17 and the HD controller 11 will be described below.

In the recording mode, the control unit 3-4 and the DMA controller 10 repeatedly exchange the request signal DMARQ (the DMA controller 10 receives as DRQ 4) and the acknowledge signal DMAAK (the DMA controller 10 outputs as DAK 4) with each other for 256 times after the request signal HDRQ is generated at the HD controller 11 (the HD controller 11 outputs as DREQ), and digital audio data of 256 words are sent from the DMA controller 10 to the filter unit 3-2. While the digital audio data are being sent, the control unit 3-4 sends no acknowledge signal HDAK to the HD controller 11 (the HD controller 11 receives as DACK). This is because, since the filter unit 3-2 executes a filter process of 256 taps, the filter unit 3-2 is prohibited from outputting a correct filtering result while it receives digital audio data of 256 words and executes the filtering process on the received data. Thereafter, the control unit 3-4 sends the acknowledge signal HDAK (DACK) to the HD controller 11. Then, the control unit 3-4 and the DMA controller 10 repeatedly exchange signals, DMARQ (DRQ 4) and DMAAK (DAK 4), and at the same time the HD controller 11 and the control unit 3-4 repeatedly exchange signals, HDRQ (DREQ) and HDAK (DACK), at the time when the HD controller 11 generates, as a trigger, the DREQ (HDRQ) signal for the number of words to be transferred. As a consequence, signals are transferred from the buffers 9-1 to 9-3 through the filter unit 3-2, the HD controller 11 to the hard disks 12a, 12b.

In the reproducing mode, the control unit 3-4 and the HD controller 11 repeatedly exchange the acknowledge signal HDAK (DAC) and the request signal HDRQ (DREQ) with each other for 256 times after the request signal HDRQ (DREQ) is generated at the HD controller 11 (the HD control), and digital audio data of 256 words are sent from the HD controller 11 to the filter unit 3-2. While the digital audio data are being sent, the control unit 3-4 sends no request signal DMARQ (DRQ 4) signal HDAK to the HD controller 11, because of the same reason. Thereafter, the control unit 3-4 sends the request signal DMARQ (DRQ 4) to the DMA controller 10. Then, the HD controller 11 and the control unit 3-4 repeatedly exchange signals, HDRQ (DREQ) and HDAK (DACK), and at the same time the control unit 3-4 and the DMA controller 10 repeatedly exchange signals, DMARQ (DRQ 4) and DMAAK (DAK 4), at the time when the HD controller 11 generates, as a trigger, the DREQ (HDRQ) signal for the number of words to be transferred. As a consequence, signals are transferred from the hard disks 12a, 12b through the HD controller 11, the filter unit 3-2 to the buffers 9-1 to 9-3.

In the reproducing mode, however, as described above, the DSP 17 starts data transfer of a filter output to the buffers 9-1 to 9-3, immediately after the HD controller 11 repeatedly generates the request signal DREQ for 256 times, and digital audio data of 256 words (one sector) have been sent from the HD controller 11 to the DSP 17. Therefore, in order to transfer digital audio data of the number of words desired to be transferred, the HD controller 11 is required to repeatedly output the DREQ signal for times corresponding to the number which is larger than the number of words desired to be transferred by the number of one sector (256 words). Therefore, the CPU 1 is required to set in the HD controller 11 the number of words which are more than predetermined number of words to be transferred by one sector (256 words).

Figure 5:
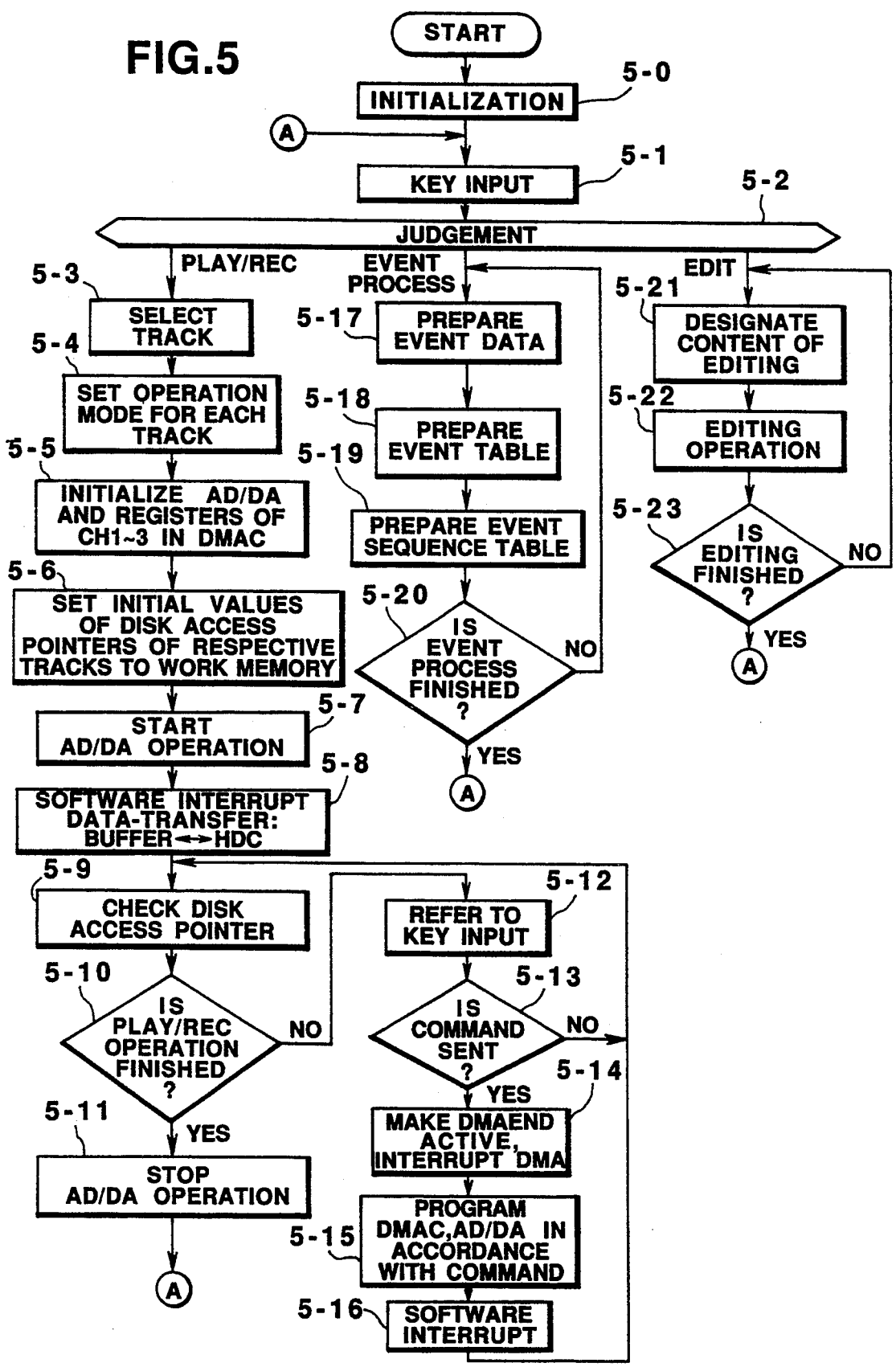
FIG. 5 is a flow chart of main routine operation of CPU 1 of FIG. 1.
Figure 6:
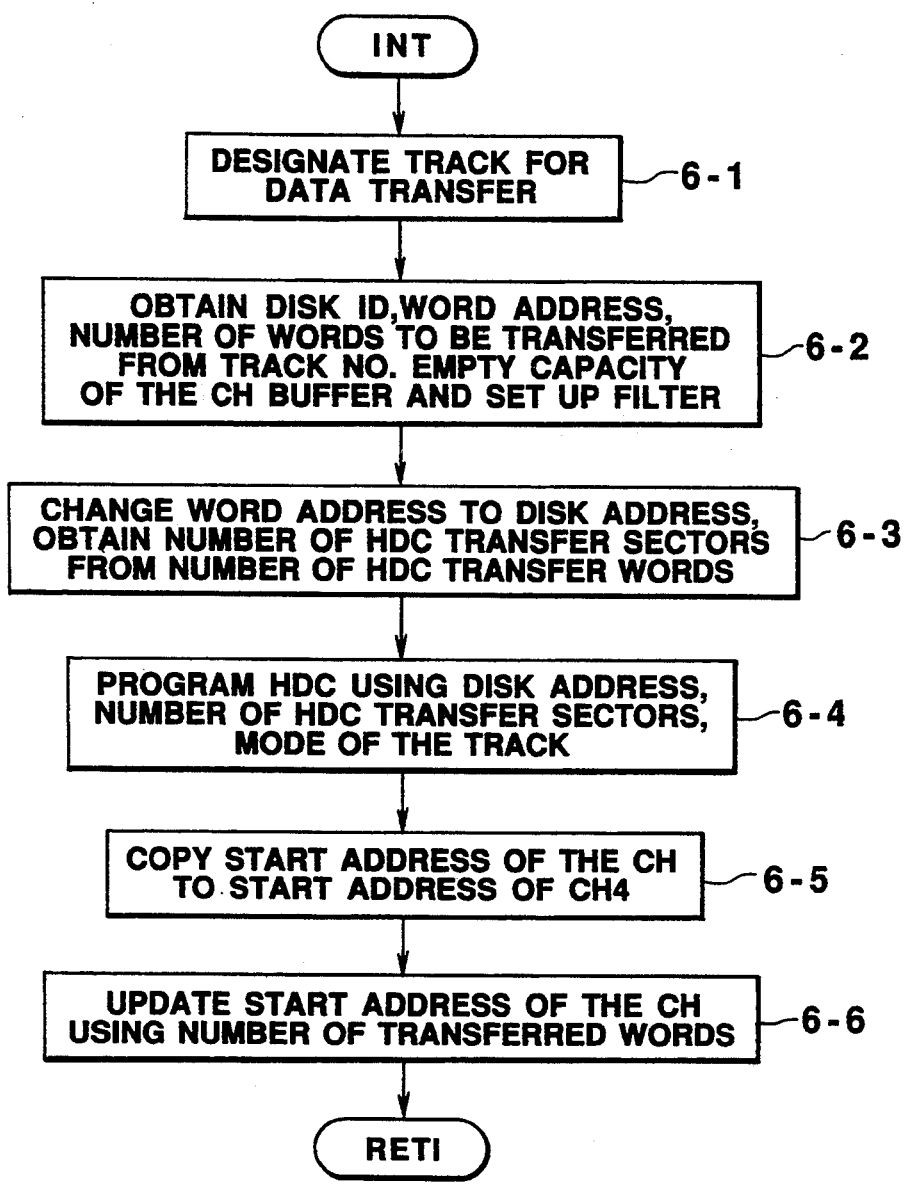
FIG. 6 is a flow chart of an interrupt routine operation of CPU 1 of FIG. 1.
Figure 7:
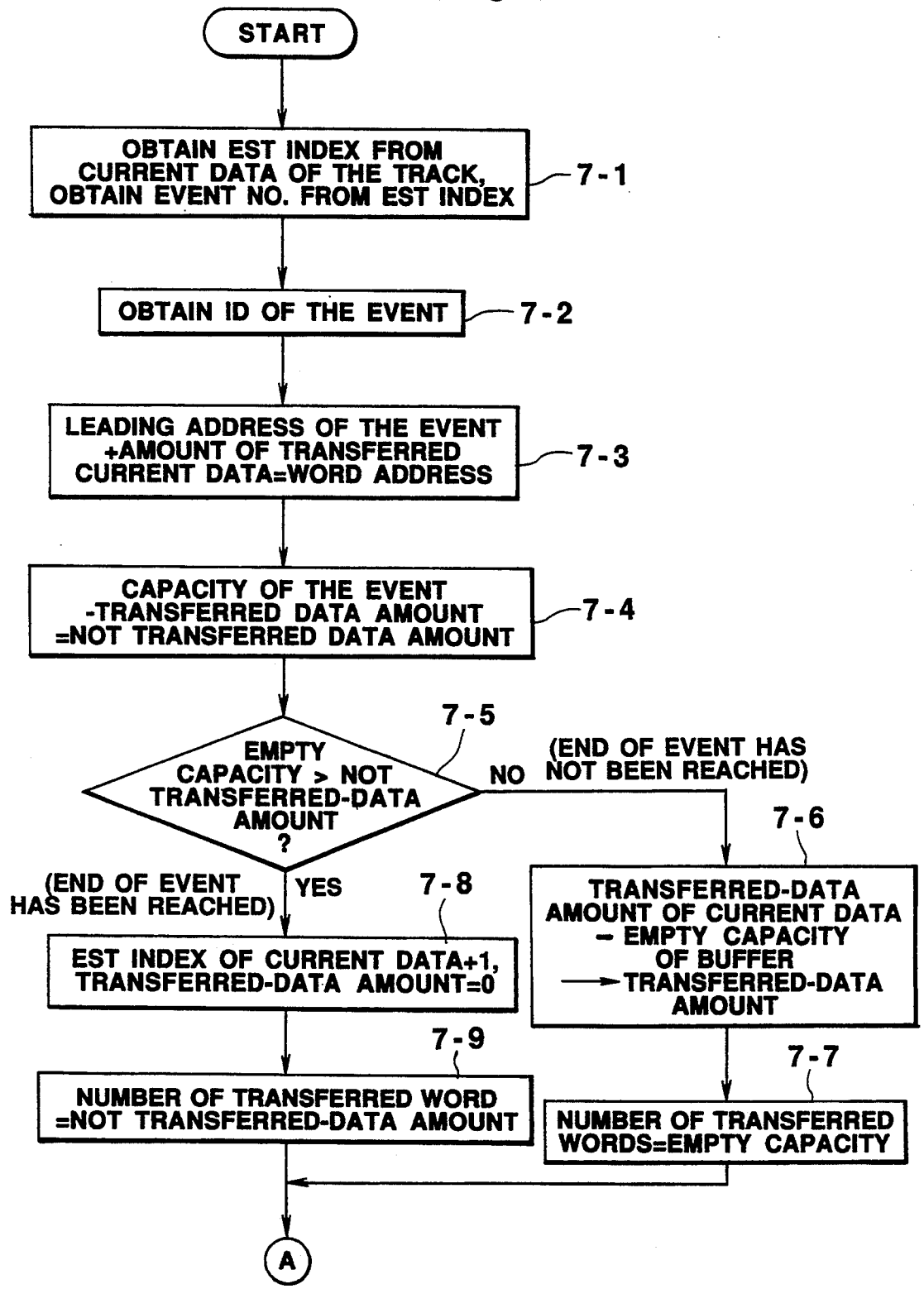
FIG. 7 is a flow chart (1) illustrating a particular process at step 6-2 in the interrupt routine operation of CPU 1.
Figure 8:
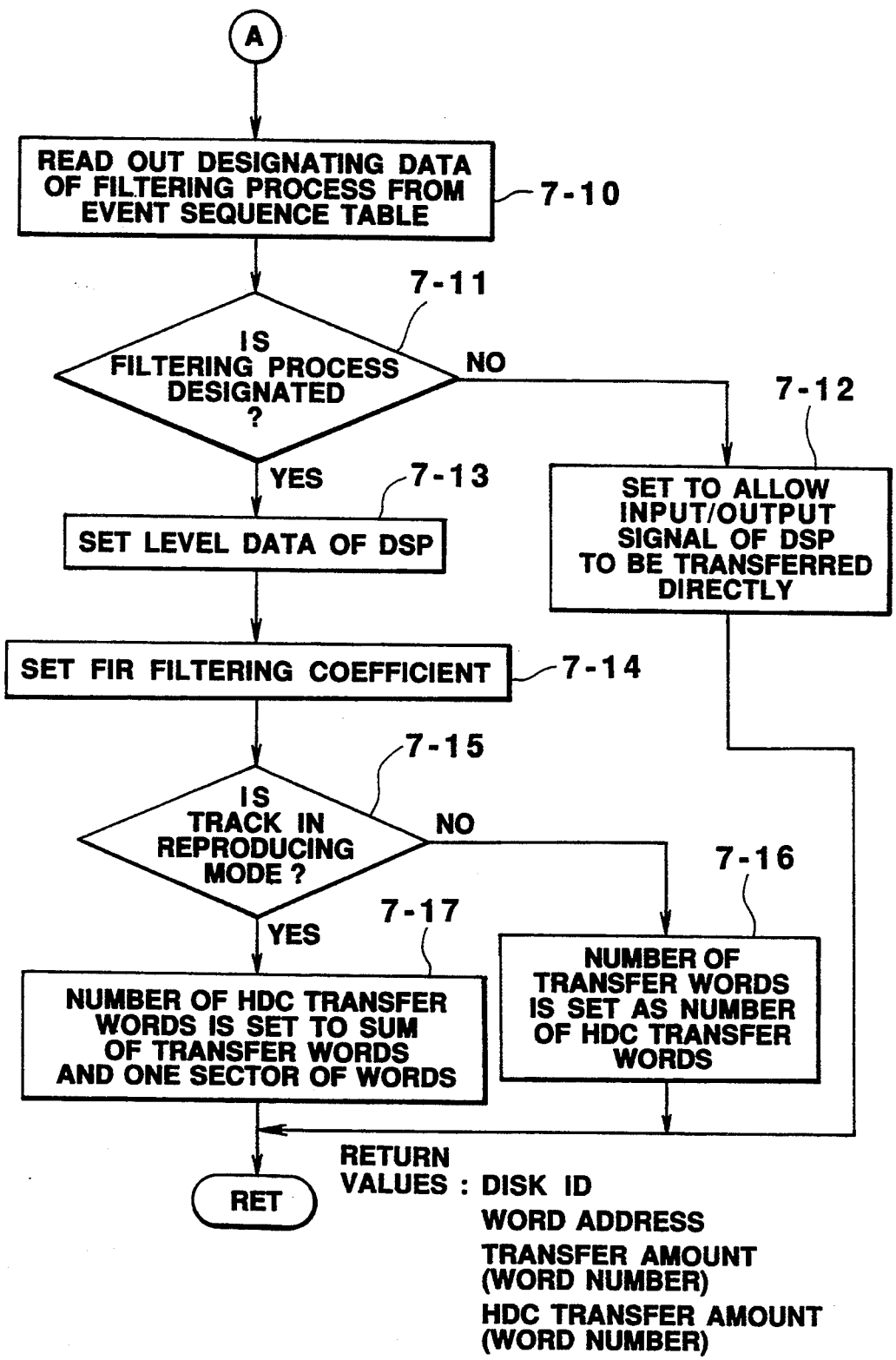
FIG. 8 is a flow chart (2) illustrating a particular process at step 6-2 in the interrupt routine operation of CPU 1.

Now, the operation of the embodiment will be described hereafter. Flowcharts of the operation of the CPU 1 are shown in FIGS. 5–8. These routine processes are executed in accordance with a program (software) stored in the program ROM 2. FIG. 5 is a flowchart of the main routine process of the CPU 1, and FIG. 6 is a flowchart of an interrupt routine process to be executed by the CPU 1 in response to receipt of the interrupt signal INT from the HD controller 11. FIGS. 7, 8 are flowcharts of a detailed process at step 6-2 of the interrupt routine process of FIG. 6.

In FIG. 5, the CPU 1 starts the main routine operation in response to a power-on operation. The CPU 1 sets various initial conditions at step 5-0. Receiving a key input at step 5-1, the CPU 1 judges at step 5-2 what operation mode has been set.

Figure 12:
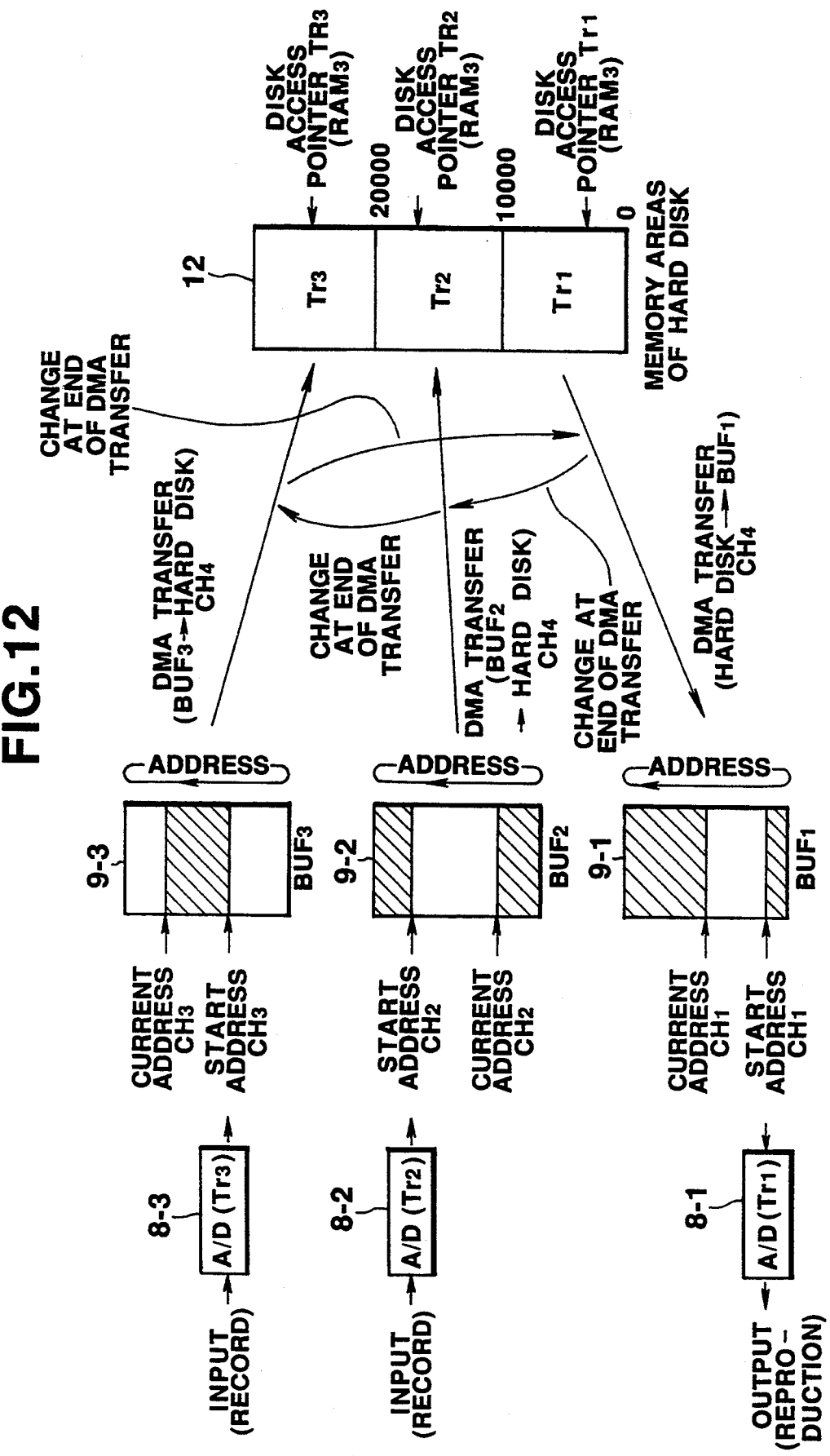
FIG. 12 is a view illustrating concept of whole operation of a digital recorder.

Judging the record/play mode is set at present, the CPU 1 advances from step 5-2 to step 5-3, where it sequentially selects and designates three tracks, and further advances to step 5-4, where the CPU 1 sets the operation modes for respective tracks in accordance with input instructions from the keyboard 4. The CPU 1 sequentially outputs at step 5-5 the designating signals CS through the buffer 6 and the decoder 13 to the audio input/output devices 8-1 to 8-3, supplying them with IOWR, and decides which operation of A/D conversion and D/A conversion the individual devices 8-1 to 8-3 should execute. Now, we assume that the playing mode (where D/A conversion is to be executed) is set for the track Tr 1, and the recording mode (where A/D conversion is to be executed) is set for the tracks Tr 2 and Tr 3. FIG. 12 is a view showing concept of whole operation of the digital recorder, when the digital recorder has been set to the operation modes as described above.

At step 5-5, the CPU 1 allows the DMA controller 10 to initialize addresses of the buffers 9-1 to 9-3 for the tracks Tr1 to Tr3. In other words, the CPU 1 sets initializing data to the registers (the address registers 104 and the control registers 105) for the respective channels CH1 to CH3 through the data buffer 106 while permitting the address buffer 101, the register selector 103 and the channel selector 109 of FIG. 2 to designate the registers.

Figure 9:
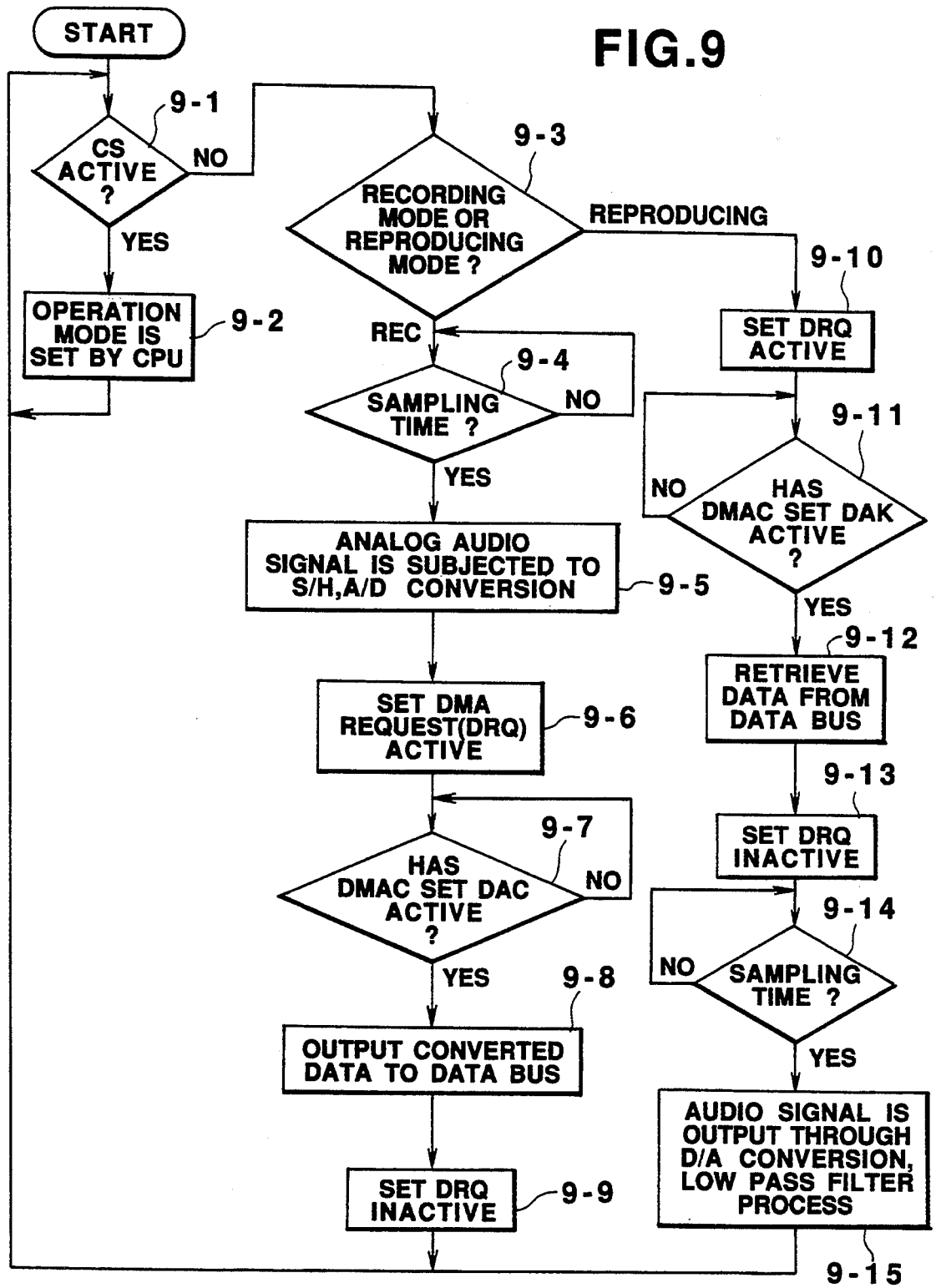
FIG. 9 is a flow chart of operation of audio input-/output units 8-1 to 8-3 of FIG. 1.

The buffers 9-1 to 9-3 are arranged to be used circularly as ring buffers. At the initial condition, the buffers 9-1 to 9-3 are arranged such that their start addresses and current addresses coincide with each other (the state is schematically shown in FIG. 9, in which the start addresses and the current addresses of the buffers 9-1 to 9-3 are stored in the address registers 104 of channels CH1 to CH3 to be controlled).

Further, the CPU 1 executes a process of step 5-6, respectively setting to initial states the disk access pointers corresponding to the respective tracks Tr1 to Tr3 of the hard disks 12a, 12b provided in the work memory area of the RAM 3 (FIG. 12 shows relationship between the memory areas in the hard disk 12 and the disk access pointers).

The CPU 1 allows at step 5-7 the audio input/output devices 8-1 to 8-3 to start executing A/D conversion or D/A conversion on received data. At step 5-8, the CPU 1 issues a software interrupt to execute the processing similar to the process that is executed when the HD controller 11 made a program request for the data transfer between the hard disk 12 and one of the buffers 9-1 to 9-3 (that is, when the HD controller 11 sends the interrupt signal INT to the CPU 1), as will be described later.

More specifically, CPU 1 executes the operation of step 5-8, in accordance with flow charts of FIGS. 6 and 7. Structures of the tables to be stored in the RAM 3 of FIG. 1 will be described before the flow charts of FIGS. 6 and 7 are explained. An event table (hereafter, referred to as "ET") and an event sequence table (hereafter, referred to as "EST") for controlling a reproduction schedule as shown in FIGS. 13–16 are defined in the RAM 3 of FIG. 1, which is provided with a memory area for storing current data or intermediate data.

An example of a registered event table is illustrated in FIG. 13. Event data to be stored in the event table is composed of an event title (an event name), a disk ID (id), which designates either of the hard disk 12a (00) or the hard disk 12b (01), the leading data address (sample (word) data address) (adrs) and event length (the number of sample data) (vol). In the event table shown in FIG. 13 original recording data "1" to "4" are automatically generated by securing an area in the recording mode.

FIG. 14 is a view illustrating an example of the EST of original recording data. In the EST, EST indexes "0" to "2" are arranged in the lateral direction (row), and the track numbers are arranged in the longitudinal direction (column), and the event number, filter type and level are stored at the relevant positions in the EST. These data are stored in the EST in a data format of "event number"—"filter type" "level". For example, FIGS. 13–14 are views which illustrate that data (event numbers 2 and 3) of the track 2 are stored in an area spanning the hard disks "00" and "01". The event number "0" is for indicating the final terminal of a sequence element.

"Filter type" is data which indicates a type of a digital filtering process to be executed by the filter unit 3-2 (FIG. 3) of the DSP 17. Filter type of "0" designates a mode in which no filtering process is executed by switching selectors 4-1, 4-2 to a bypass line, and filter types of "1", "2", "3" designate modes which switch The selectors 4-1, 4-2 to a filter side to supply relevant filter coefficient data to the corresponding multipliers of FIG. 4, respectively, and allow the filter unit 3-2 to execute a low pass filtering process, a band pass filtering process and a high pass filtering process, respectively.

Further, "level" is data which sets an amplitude level of a digital audio signal to be set by the multiplier 4-5 which is provided at the output side of the filter unit 3-2 (FIG. 3) of the DSP 17.

As described above, the present embodiment is characterized in that a digital filtering process and a level control process may be performed on a signal expressed in the unit of events.

FIG. 15 illustrates an example of the EST of an editing work of No. 1. In the EST, events are defined by the user himself, and are arranged in relevant tracks to be output therefrom. Similarly, the EST indexes "0" to "8" are disposed in the lateral direction (row) and the track numbers are disposed in the longitudinal direction (columns), and event numbers, filter types, level data are stored at relevant positions in the EST. Therefore, a plurality of ESTs are prepared for respective works.

Current data which are being transferred by the DMA transfer are shown in FIG. 16. The EST index numbers for respective tracks to be DMA-transferred at the following transfer, and the number of events (number of bytes of an integer multiple of 512 bytes (one sector)) which have been already transferred are memorized.

Operation of the CPU 1, which will be performed when the event sequence of FIG. 15 defined by the user is reproduced, will be described with reference to the flow charts of FIGS. 6–8.

With respect to Tr 1, the channel CH1 corresponding to Tr 1 is selected as the channel of the DMA controller 10 at step 6-1 to perform DMA transfer of digital signal data from the hard disks 12a, 12b to the buffer 9-1.

At step 6-2, a disk ID, a word address, the number of words to be transferred are obtained form a track number and an empty capacity (a capacity available for data transfer) of the channel buffer. The detailed flow chart of the process at step 6-2 is shown in FIGS. 7-8. Since DMA transfer is executed in the unit of sectors as described above, the empty capacity of the buffer is calculated in the units of sectors, too.

At step 7-1 of FIG. 7, EST index is obtained from current data of the corresponding track, and an event number is obtained, based on the EST index, from an event sequence table shown in FIG. 15. At step 7-2, the ID of the event is obtained, based on the event number, from the event table shown in FIG. 13.

The word address is calculated at step 7-3 from the following equation: "the leading address of the event + - the amount of current data which have been already transferred (a transferred-data amount)=a word address". The leading address of the event is obtained from the event table shown in FIG. 13 and the amount of current data which have been already transferred (the transferred-data amount) is obtained from the current data shown in FIG. 16.

CPU 1 calculates at step 7-4 an amount of data which have not been transferred (a not transferred-data amount) from the following equation: "the capacity of the event—the transferred-data amount=a not transferred-data amount". The capacity of the event is obtained from the event vol shown in FIG. 13, and the transferred-data amount is obtained from the current data of FIG. 16.

CPU 1 judges at step 7-5 whether an empty capacity of the buffer is larger than the not transferred-data amount. When the result of the judgement at step 7-5 is "NO", the following arithmetic operation is performed at step 7-6: "a transferred-data amount of the current data+an empty capacity of the buffer=a transferred-data amount", because the end of the events is not reached even if all of block data of an amount corresponding to the empty capacity of the buffer are transferred. At step 7-7, "the number of transferred words=an empty capacity" is set. Meanwhile, when the result of the judgement at step 7-5 is "YES", the following operations are performed at step 7-8: the index of EST of the current data is incremented by "+1" and the transferred-data amount is set to "0", because the end of the event is reached when all of block data of the not transferred amount of events are transferred before all of block data of an amount corresponding to the empty capacity of the buffer are transferred. To transfer all of remaining events which have not been transferred, "the number of words to be transferred=a not transferred data amount" is set at step 7-9.

When a data transfer amount has been obtained through the previous steps, CPU 1 goes from step 7-9 to step 7-10, where designating data of filtering process is retrieved from among the elements in the event sequence table to be subjected to process at present.

At step 7-11, the CPU 1 judges whether the filter type (see FIGS. 14, 15) is "0", i.e., whether a filtering process is designated. If NO, the CPU 1 switches the selectors 4-1, 4-2 to the bypass line (FIG. 4) in the filter unit 3-2 (FIG. 3) of the DSP 17 in order to connect the input side of the filter unit 3-2 directly with its output side, whereby the control unit 3-4 is allowed to transfer an HDRQ (DREQ) signal of the HD controller 10 to the DMA controller 10 as a DMAAK (DAK 4) signal, and to transfer DMAAK (DAK 4) signal of the DMA controller 10 to the HD controller 11 as an HDAK (DACK) signal. Further, the CPU 1 sets "1" as a multiplying coefficient to the multiplier 4-5 in the filter unit 3-2 (FIG. 3) of the DSP 17, which means that no multiplying operation will be performed. As described above, the DSP 17 is bypassed completely.

Meanwhile, if YES at step 7-11, the CPU 1 sets a value as the multiplying coefficient to the multiplier 4-5 in the filter unit 3-2 (FIG. 3) of the DSP 17, the value which corresponds to level data (see FIGS. 14, 15) among elements in the event sequence table to be subjected to process at present.

The CPU 1 switches the selectors 4-1, 4-2 (FIG. 4) to the filter side, and supplies filer coefficient data of respective filter types (see FIGS. 14, 15) among the elements in the event sequence table to be processed at present, and designates respective modes which allow the filter unit 3-2 (FIG. 3) to execute the low pass filtering process, the band pass filtering process or the high pass filtering process.

The CPU 1 judges at step 7-15 whether the track to be processed at present is set to the reproducing mode. If the track is not set to the reproducing mode, the CPU 1 sets, at step 7-16, the number of words to be transferred, which is calculated at step 7-7 or step 7-9, to the HD controller 11 as the number of words to be transferred (HDC transfer amount). If the track is set to the reproducing mode, the CPU 1 sets, at step 7-17, the sum of the number of words to be transferred, which is calculated at step 7-7 or step 7-9, and one sector (256 words) to the HD controller 11 as the HDC transfer amount. The reason for adding 256 words (one sector of words) to the calculated number of words to be transferred and setting the sum as the HDC transfer amount in the reproducing mode is as follows: since the DSP 17 starts transferring the filter output to the buffers 9-1 to 9-3 after the HD controller 11 generates the DREQ signal for 256 times and transfers one sector of digital audio data, i.e., 256 words to the DSP 17, the HD controller 11 is required to repeatedly output the DREQ signal for multiple times which correspond to the number larger than the number of words to be transferred by one sector of words (256 words), in order to transfer desired number of words from the DSP 17 to the buffers 9-1 to 9-3.

When a disk ID, a word address, number of words to be transferred and an HDC transfer amount (HDC transfer word number) of the present event are obtained in the process of step 6-2 of FIG. 6 shown in FIGS. 7-8, the word address is converted into a disk address and number of HDC transfer sectors is calculated from the HDC transfer word number at step 6-3 of FIG. 6.

At step 6-4, CPU 1 programs the HD controller 11, using the disk address and the number of HDC transfer sectors. Further, the data-transfer direction of CH 4 is programmed depending on the recording mode or reproducing mode of the track to be processed at present (data are transferred from the buffers 9-1 to 9-3 to the hard disks 12a, 12b in the recording mode while data are transferred in the opposite direction in the reproducing mode). As described above, the number of HDC transfer sectors in the reproducing mode is set to a number which is larger than the number of sectors corresponding to the number of words to be actually transferred by one sector.

At step 6-5, the start address of the relevant CH (for example, CH 1) of the address register 104 (FIG. 2) in the DMA controller 10 is copied to the start address of the CH 4.

Further at step 6-6, the start address of the relevant CH is updated using the number of words to be transferred, which is calculated at step 7-7 or 7-9. The CPU 1 returns to the main routine operation of FIG. 5. As described, the start address of the CH is updated using the number of actually transferred words instead of the HDC transfer word number, and when data of the following track is transferred, data will be retrieved from the following position which advances by the number of transferred words to be processed at the last time.

As will be clear from the later description, once the first interrupt routine process is caused and the HD controller 11 is enabled at step 5-8, the HD controller 11 initiates a hardware interrupt, i.e., the HD controller 11 sends the INT signal to the CPU 1 every time the transfer of data block designated by CPU 1 has been finished. The HD controller 11 is newly programmed when the interrupt routine of FIGS. 6-8 is caused. While the CPU 1 waits for the interrupt, the CPU 1 repeatedly executes a loop process: steps 5-9 to 5-10 to 5-12 (to 5-15) to 5-8 of FIG. 5 in order to make judgement as to whether the recording/reproducing operation has been finished, or whether a key input is entered or it is triggered in accordance with instruction included in control data.

More specifically, the CPU 1 refers to the disk access pointer (RAM 3) at step 5-9, judging whether a memory area is overflowed, i.e., whether the operation is finished. When YES, the CPU 1 makes at step 5-11 the audio input/output devices 8-1 to 8-3 to stop executing A/D conversion or D/A conversion, and returns to step 5-1. When NO, the CPU 1 refers to a key input state at step 5-12, judging at step 5-13 whether any instruction is given.

If no change in the key input state has been found, the CPU 1 returns to the process of step 5-9, and repeatedly executes processes of steps 5-9 to 5-13.

When some changes in the key input state have been found, the CPU 1 advances from step 5-13 to step 5-14, where the CPU 1 temporarily interrupts DMA transfer, and outputs a DMA interrupt command (DMAEND) to the DMA controller 10 for effecting new setting.

Further, the CPU 1 programs at step 5-15 the DMA controller 10 and the audio input/output devices 8-1 to 8-3 in accordance with newly input command, and advances to step 5-16, where it executes the interrupt routine of FIGS. 6-8 in order to start the DMA operation again. Then, the CPU 1 returns to step 5-9.

In the reproducing/recording mode, the CPU 1 effects an initialization at steps 5-4 to 5-8, and then repeatedly executes processes at steps 5-9 to 5-10 to 5-12 to 5-13 and selectively executes processes at steps 5-14 to 5-16, wherein the CPU 1 interrupts the DMA transfer control immediately and alters the program in response to a command of alteration sent from the key board 4 (for example, pause for a track (interrupt of the A/D conversion and D/A conversion) or a punch in/punch out (switching of the A/D conversion and D/A conversion)) or to changes in control data obtained in the editing mode. Then, the CPU 1 operates to execute similar processes.

When CPU 1 judges at step 5-2 that an event process mode has been set at present, then CPU 1 advances from step 5-2 to step 5-17, where digital audio data stored in the hard disks 12a, 12b are converted into event data. That is, continuous audio data on a time axis is divided into a plurality of separated audio data (events), and data representative of event names (title) for designating the separated audio data, and data representative of disk ID, and data representative of separated spaces (start points and the lengths (volume)) are produced. Then, an event table (ET) of FIG. 12 is prepared for the events at step 5-18. Event names, disk ID, start points and volume are registered in the event table. The disk ID, start points and volume correspond to start addresses and event lengths of the hard disk 12a, 12b, on which relevant events are stored.

At step 5-19, an event sequence table EST (see FIGS. 14, 15) is prepared based on the above event table. The event processes at steps 5-17 to 5-19 will be repeatedly executed, and when an instruction of an operator to stop preparing the EST is detected at step 5-20, the CPU 1 returns to step 5-1, where it checks the key input state again.

When CPU 1 judges at step 5-2 that an editing mode has been set at present, then the CPU 1 advances from step 5-2 to step 5-21, where it judges at which track and at which point editing should be made and how the editing should be made (for example, timing of a sound stored at a point designated for a given time is shifted before or after, is amended or the sound is deleted). Then, the CPU 1 executes various editing operations at step 5-22. The editing operations will not be described particularly in detail. Various operations are performed under the control of the CPU 1, such as programming of access points on the hard disks 12a, 12b, to which the HD controller 11 and the DMA controller 10 are allowed to access to read out data, data transfer to the RAM 3, various editing operations using the RAM 3, re-storing operation of edited digital audio data to the hard disks 12a, 12b, designation of access points, and so on. When it is judged at step 5-23 that the editing operation has been finished, the CPU 1 returns to step 5-1, where it checks the key input state again.

The operation of the audio input/output devices 8-1 to 8-3 will now be described referring to the flowchart of FIG. 9. This flowchart may be realized by either microprogram control or hard logic control, and there are various types of means for accomplishing the functions.

It is judged at step 9-1 whether or not the designating signal CS for designating the audio input/output device has been sent from the CPU 1, i.e., whether the signal is active or not. When the result of the judgement is "YES", an operation mode (recording mode, reproducing mode or stopping mode) is set by the CPU 1 at step 9-2. This setting process is to be executed in response to processes at steps 5-5 and 5-15 in the main routine process of CPU 1 of FIG. 5.

When the result of the judgement at step 9-1 is "NO", it is judged whether the audio input/output devices 8-1 to 8-3 are in the recording mode or in the reproducing mode. If it is determined at step 9-3 that the devices are in the recording mode, the operation advances from step 9-3 to steps 9-4 to 9-9. Meanwhile, if it is determined at step 9-3 that the devices are in the reproducing mode, the operation advances to steps 9-10 to 9-15.

A description will be given of the operation of the audio input/output devices which is set to the recording mode (the audio input/output devices 8-2 and 8-3 in this case). It is judged at step 9-4 if a sampling time has been reached. The process at step 9-4 will be repeatedly executed until the sampling time is reached. The audio input/output devices 8-1 to 8-3 may have hardware timers respectively, and judge the sampling time based on the outputs of the hardware timers. Otherwise, a common hard timer may be provided so that each audio input/output device can be driven by the output of the common hard timer. It will be understood from the later description that the different sampling frequencies may be set to the audio input/output devices 8-1 to 8-3, respectively.

When the judgement at step 9-4 is "YES", the transferred analog audio signal is subject to sample holding (S/H) and A/D conversion. The audio input/output devices set the DMA transfer request signal DRQ active and output the request signal to the DMA controller 10 at step 9-6.

Receiving the DMA transfer request signals DRQ (DRQ 1, DRQ 2, DRQ 3) from the respective audio input/output devices, the DMA controller 10 outputs the response signal DAK (DAK 1, DAK 2, DAK 3) to execute DMA transfer. When the judgement at step 9-7 is "YES", the audio input/output device 8-1, 8-2 or 8-3 (in this case, the audio input/output device 8-2 or 8-3 which is set to the recording mode) goes to step 9-8, where the device outputs the audio data subjected to A/D conversion via the data bus to the corresponding buffer 9-1, 9-2 or 9-3 (the buffer 9-2 or 9-3 in this case). The DMA transfer request signal DRQ is then made inactive at step 9-9. Therefore, the audio input/output device 8-2 or 8-3 in the recording mode converts, every sampling intervals, the externally supplied analog audio signal into digital audio data, and transfers the digital audio data to the current address of the buffer 9-2 or 9-3 which is designated by the DMA controller 10, as will be described later (refer to FIG. 12).

When it is judged at step 9-3 that the audio input/output device is set to the reproducing mode, the operation goes to step 9-10, where the DMA transfer request signal DRQ to the DMA controller 10 is made active. Upon receipt of the response signal DAK from the DMA controller 10 at step 9-11, the audio input/output device retrieves the digital audio data on the data bus D1 at step 9-12, and then sets the DMA transfer request signal DRQ inactive at step 9-13. By the above operation, the content of the current address of the buffer 9-1 corresponding to the track Tr1 (where the content of the Tr1 area of the hard disk 12 has been transferred and stored) will be set to the audio input/output device 8-1. Then, it is judged at step 9-14 if the sampling time has been reached. The detection of the sampling time is effected in the similar manner to that executed at step 9-4.

When it is judged at step 9-14 that the sampling time has been reached, the operation goes to step 9-15, where the digital audio signal is subjected to D/A conversion and low-pass filtering operation. Then, the analog audio signal is audibly output.

The operation of the audio input/output device set in the recording mode at a sampling time and the operation of the device set to the reproducing mode at a single sampling time have been described. After the processes at steps 9-9 and 9-15 have been executed, the operation returns to step 9-1, and similar processes will be executed at the following sampling times.

Operation of DMA Controller 10

Figure 10:
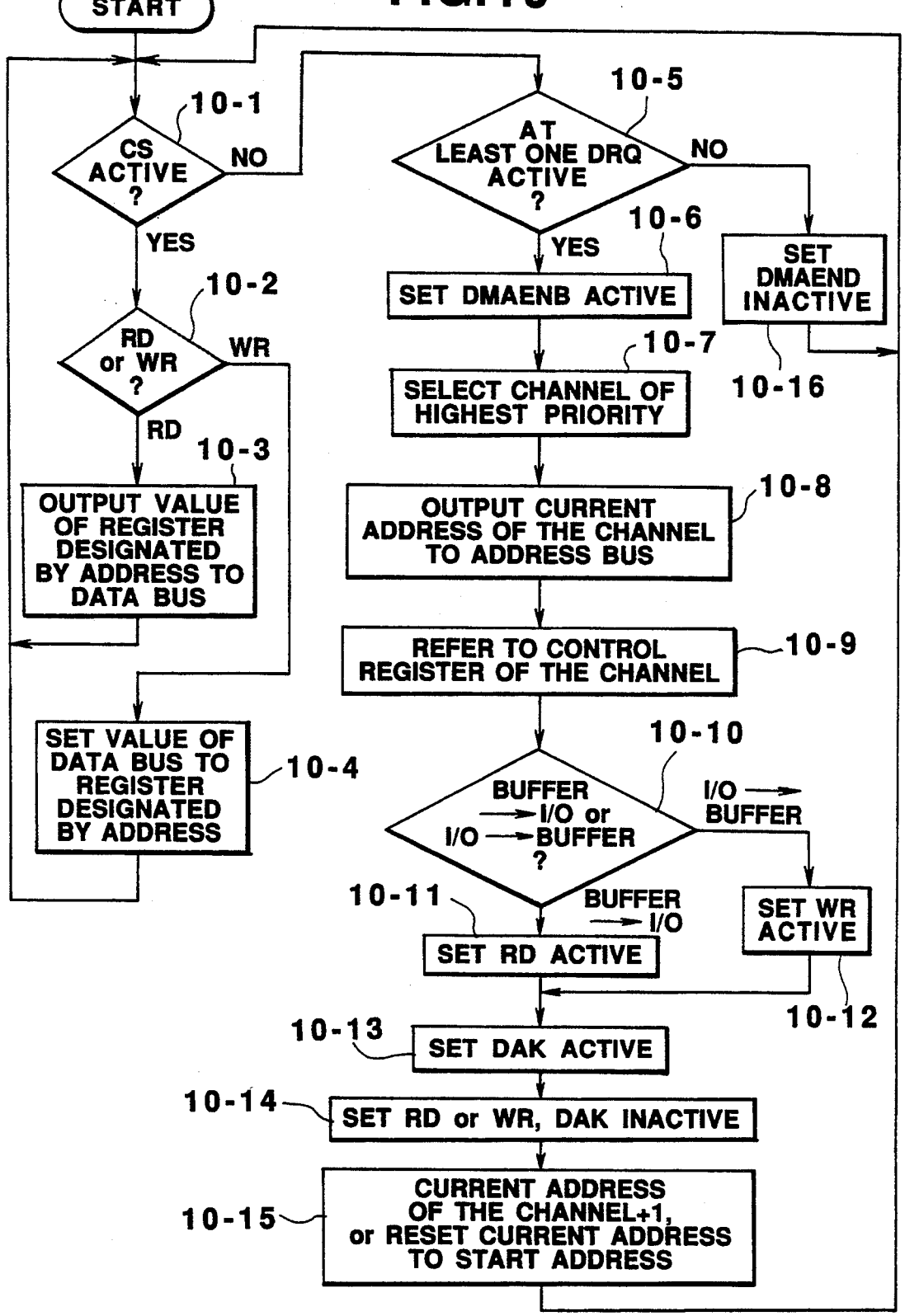
FIG. 10 is a flow chart of operation of DMA controller 10 of FIG. 1.

The operation of the DMA controller 10 will be described referring to FIG. 10. The flowchart of FIG. 10 may illustrate that the service controller 108 of FIG. 2 operates under control of the microprogram control, or that the DMA controller 10 realizes its function by a hardware logic.

It is judged at step 10-1 whether the designating signal CS has been supplied from the CPU 1 (i.e., whether the signal CS has been made active). When the signal is active, it is judged at step 10-2 anyone of a read signal RD and a write signal WR is supplied from the CPU 1. When the read signal RD is supplied, the operation goes to step 10-3, where the contents of the registers 104, 105, which are designated by the address signals supplied via the address bus are output on the data bus D1, so that the CPU 1 can read them. When the write signal WR is supplied, the operation goes to step 10-4, where desired data will be set to a designated register via the data bus D 1. The processes at steps 10-3 and 10-4 correspond to those at steps 5-5 and 5-15 in the main routine process of the CPU 1. Accordingly, the desired data will be set to the registers 104 and 105 of FIG. 2 respectively through the process at step 10-4.

When the CPU 1 terminates the accessing to or the programming of the DMA controller 10, the designating signal CS is set inactive, and the operation goes from step 10-1 to step 10-5.

It is judged at step 10-5 whether the DMA transfer request signals DRQ1 to DRQ3 are supplied from the respective audio input/output devices 8-1 to 8-3, or whether the DMA transfer request signal DMARQ (DRQ 4) is supplied from the DSP 17. When a request signal is sent from any of the components, the operation goes to step 10-6, where the DMA enable signal DMA-ENB is set to "1" or active, and only the DMA controller 10 is allowed to use the address bus and the data bus D 1 in the DMA unit, disabling any access from the CPU 1.

When multiple requests are made, the DMA controller 10 successively selects channels at step 10-7 in priority order of the channel, from CH1 down to CH4.

The current address (the content of the current address register of CH 2 of the address register 104) of the selected channel (CH 2 in this case) is output to the address bus at step 10-9. The DMA controller 10 refers to the content of the control register 105 of the selected channel (CH 2 in this case), and decides at step 10-10 in which direction the DMA transfer is to be effected.

When the DMA controller 10 decides to transfer data from the buffers 9-1 to 9-3 to the other I/O components (the DSP 17 or the input/output devices 8-1 to 8-3), the operation goes from step 10-10 to step 10-11, where the DMA controller 10 supplies the read signal RD to the buffer selected from among the buffers 9-1 to 9-3. When the data is to be transferred from the other components (I/O) to the buffers 9-1 to 9-3, the operation goes to step 10-12, where the DMA controller 10 supplies the write signal WR to the relevant buffer.

At step 10-13, the acknowledge signal DAK is made active. As a result, the audio input/output device 8-2 of the Tr2 will output to the data bus D 1 digital audio data sampled in the processes at steps 9-7 and 9-8 of FIG. 9, and the DMA controller 10 will write the sampled digital audio data to the area at the current address in the buffer 9-2, as shown in FIG. 12.

Since the data transfer has been finished, the read signal RD or the write signal WR, and the acknowledge signal DAK are made inactive at step 10-14. At step 10-15, the DMA controller 10 increments the content retained at the current address (in the address register 104 of FIG. 2) of the relevant channel (CH2 in this case) by one. When the above content retained in the address register 104 has reached the final address of the buffer, the address register 104 is set to the start address of the buffer. The content of the address register 104 will be incremented or reset to the start address of the buffer through the process at step 10-15 every time other sampled audio data is written into or read out from the buffers 9-1 to 9-3. The operation returns from step 10-15 to step 10-1.

In the aforementioned state, the audio input/output devices 8-2 and 8-3 of Tr2 and Tr3 have made request for data transfer to the DMA controller 10. Since the data transfer has been executed only in Tr2, the DMA controller 10 judges "YES" at step 10-5. Through the processes at steps 10-0 to 10-10, 10-12 to 10-15, data of Tr 3 is transferred from the audio input/output device 8-3 to the buffer 9-3 in the same manner as above.

After the data transfer is finished, the operation advances from step 10-5 to step 10-16, where the DMA enabling signal is made "0" (inactive). Then, the DMA controller 10 is prohibited from occupying the data bus D 1 and the address bus in the DMA unit, allowing the CPU 1 to access these buses.

With respect to the Tr2 and Tr3, the description of the data transfer from the audio input/output devices 8-2 and 8-3 to the corresponding buffers 9-2 and 9-3 has been given. Concerning Tr1, the DMA controller 10 executes data transfer in the opposite direction, i.e., from the buffer 9-1 to the audio input/output device 8-1.

The CPU 1 will execute data transfer between the buffers 9-1 to 9-3 corresponding to the tracks in operation and the hard disks 12a, 12b sequentially track by track, and the data transfer following the previous data transfer (block transfer) will be executed for each track. In the instance shown in FIG. 12, with respect to Tr1, data of the amount which corresponds to the empty space in the buffer 9-1 defined by the start address (CH 1) and the current address (CH 1) as shown in FIG. 12 is to be transferred from the hard disks 12a, 12b to the buffer 9-1. (With respect to the other tracks Tr2 and Tr3, it will be apparent that, though the direction of the data transfer is opposite, data transfer will be executed from the buffers 9-2 and 9-3 to the hard disks 12a, 12b under control of the DMA controller 10.) In the buffer 9-1 in the reproducing mode and the buffers 9-2 and 9-3 in the recording mode, the shaded portions correspond to the audio data which has been input.

Detecting the data transfer request made by the DSP 17 at step 10-5, the DMA controller 10 performs the processes at steps 10-6 to 10-9 as done above, and then goes to step 10-10, where it judges whether the data transfer from the buffers 9-1 to 9-3 to the hard disks 12a, 12b is requested or the data transfer in the opposite direction is requested. When the former transfer is requested, the operation goes to step 10-11. When the latter transfer is requested, the operation goes to step 10-12, and then the processes at steps 10-13 to 10-15 are executed. In this case, since digital audio data of one sample is transferred in a single transfer operation, the block transfer will be done by repeatedly executing the processes of steps 10-5 to 10-15 for several times. The data transfer between the hard disks 12a, 12b and the buffers 9-1 to 9-3 will be further described later because the operations of the HD controller 11 and the DSP 17 are concerned with the above data transfer.

When the DMA transfer has been completed, the transfer request signals DRQ 1 to DRQ 4 will not be sent forth, and the operation advances from step 10-5 to step 10-16, where the DMA controller 10 sets the DMA enabling signal DMAENB to "0" (inactive).

Figure 11:
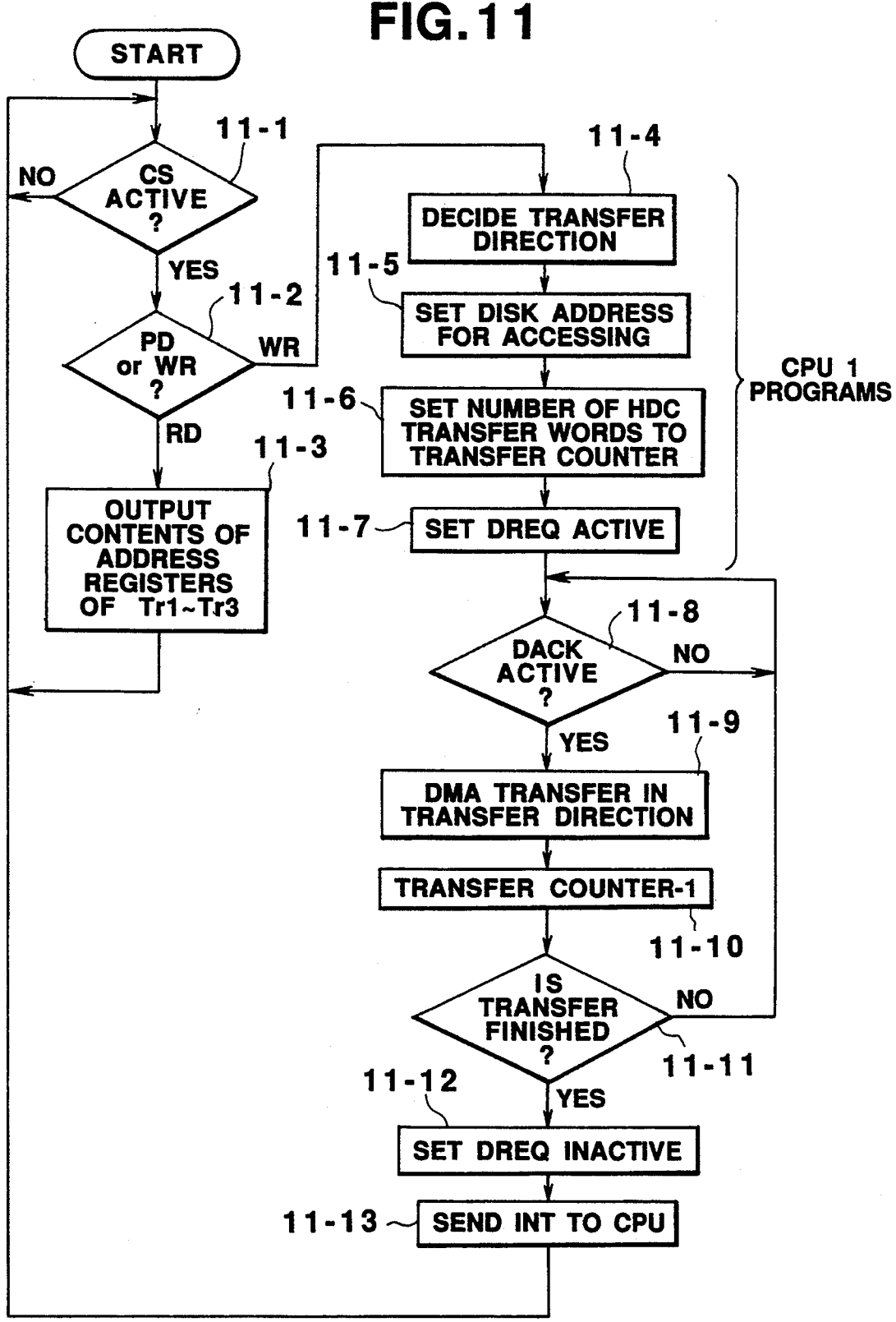
FIG. 11 is a flow chart of operation of HD controller 11 of FIG. 1.

The operation of the HD controller 11 will now be explained referring to FIG. 11. The functions of the HD controller 11 may be realized by either a hardware logic or microprogram control; in either case, the operational flow in FIG. 11 can be accomplished.

First, it is judged at step 11-1 whether or not the designating signal CS has been given from the CPU 1; this signal is supplied in the interrupt routine of the CPU 1. If the judgement is negative (NO), the operation returns to step 11-1 again, but if the judgement is positive, "YES", the operation goes to step 11-2. At the step 11-2, it is judged whether the read signal RD or the write signal WD is sent from the CPU 1. If the read signal RD is supplied, the designated data in the HD controller 11 (the content of the address register or the like) is sent through the data bus to the CPU 1.

If the write signal WR has been given from the CPU 1, the operation moves from step 11-2 to step 11-4 to set the direction of DMA transfer between the buffer and hard disks 12a, 12b, which are to be conducted in the channel CH4 of the DMA controller 10. At the following step 11-5, the access points of the hard disks 12a, 12b to be accessed are set by the disk access pointer of the track which the CPU 1 has acquired from the RAM 3.

At the following step 11-6, the number of word to be transferred, which corresponds to HDC transfer sector number, is set in an internal counter of the HD controller 11. The number of words to be transferred is obtained in the interrupt routine of the CPU 1, and, as described above, a number of words, which is larger than the number of actually transferred words by 256 words (one sector of words), have been set in the reproducing mode.

The HD controller 11 moves from step 11-7 to step 11-8, and executes repeatedly the process of step 11-8 until the HD controller 11 receives the acknowledge signal DACK (HDAK) from the DSP 17.

When the judgment at step 11-8 is affirmative, "YES", the operation advances to step 11-9, where digital audio data of one sample is transferred, and the transfer counter set at step 11-6 is decremented by "1" at step 11-10. According to the content of the transfer counter, it is determined at step 11-11 whether data transfer of a previously set number of words has been completed. When the judgment is negative, "NO", the operation returns to step 11-8.

DMA transfer (block transfer) is executed among the buffers 9-1 to 9-3, the DSP 17 and the DMA controller 10 until transfer of the words set through the HD controller 10 to be transferred has been finished.

When it is judged at step 11-11 that data transfer has been finished, the operation moves to step 11-12, where the data transfer request DREQ (DACK) from the HD controller 11 to the DSP 17 is set to "0" (inactive). The HD controller 11 sends the interrupt signal INT to the CPU 1 at step 11-13 to execute data transfer for the next track between the hard disks 12a, 12b and either of the buffers 9-1 to 9-3. In response to this interrupt signal INT, the CPU 1 executes the interrupt routine process as described above.

Finally, operation of the DSP 17 will be described.

With respect to the function of the DSP 17, the selected state of the input port switching unit of FIG. 3, the selected state of the selectors 4-1, 4-2 of FIG. 4, the filter coefficient data to be supplied to the respective multipliers 4-3 have been described, and it has been also described that level data to be supplied to the multiplier 4-5 is programmed by the CPU 1 before DMA transfer (block transfer) is executed. (See steps 7-11 to 7-14 of FIG. 8.)

DMA transferring operation of the control unit 3-4 of FIG. 3 will be described with reference to FIGS. 17A, 17B and FIG. 18.

As described above, to meet the causality of the digital filter, the control unit 3-4 operates not to generate any output before 256 taps are filled (see FIG. 4), while DMA transfer is being executed.

Figure 17A:
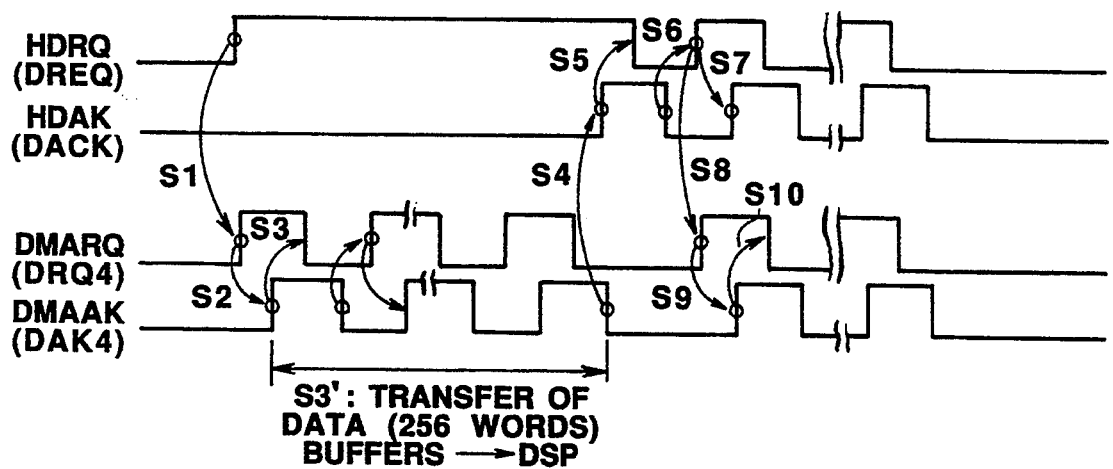
FIGS. 17A and 17B are timing charts illustrating control operation of DSP 17.
Figure 17B:
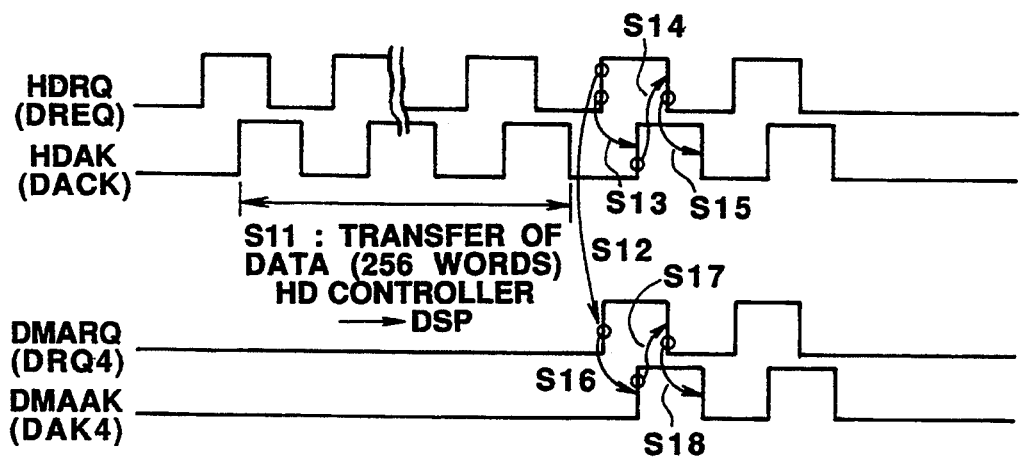

In the recording mode, the control unit 3-4 first controls the respective timing signals between the DMA controller 10 (FIG. 1) and the HD controller 11 (FIG. 1), as illustrated in FIG. 17A.

Upon receipt of the request signal HDRQ (DREQ) from the HD controller 11 (S1), the control unit 3-4 outputs the request signal DMARQ (DRQ 4) to the DMA controller 10 (S2). The control unit 3-4 receives the acknowledge signal DMAAK (DAK 4) (S3), when data transfer is ready for execution. At the same time, the control unit 3-4 outputs an input enable signal to the input port switching unit 3-1 after causing the same unit 3-1 to select the data bus D 1. As a result, data transfer is allowed to be actually transferred from the buffers 9-1 to 9-3 to the filter unit 3-2.

The control unit 3-4 does not output an output enable signal to the output port switching unit 3-3 and does not output the acknowledge signal HDAK to the HD controller 11, until data of 256 words are read out from the buffers 9-1 to 9-3. This is because that the filter unit 3-2 can not output a correct filtering result, before the filter unit 3-2 receives digital audio data of 256 words and subjects them to a 256-taps filtering process.

When, by repeatedly exchanging signals DMARQ (DRQ 4) and DMAAK (DAK 4), digital audio data of 256 words are read out via the data bus D 1 from the buffers 9-1 to 9-3, and the data are gradually subjected to the filtering process by the filter unit 3-2 (S3'), the control unit 3-4 outputs the acknowledge signal HDAK (DACK) to the HD controller 11 (S4), and simultaneously outputs the output enable signal to the output port switching unit 3-3 after causing the unit 3-3 to select the data bus D 2. As a result, data is allowed to be actually transferred from the filter unit 3-2 to the HD controller 11.

Thereafter, exchange of signals DMARQ (DRQ 4), DMAAK (DAK 4) between the control unit 3-4 and the DMA controller 10 (from S8, S9 to S10) as well as exchange of signals HDRQ (DREQ), HDAK (DACK) between the HD controller 11 and the control unit 3-4 are repeatedly executed at the trigger of the DREQ (HDRQ) signal which is repeatedly generated by the HD controller 11 for several times for transferring the number of words to be transferred. As a result, a transferring process is executed: DMA transfer (block transfer) from the buffers 9-1 to 9-3 to the filter unit 3-2; the filtering process by the filter unit 3-2; DMA transfer (block transfer) of the filter output from the filter unit 3-2 to the HD controller 11; and storage of data to the hard disks 12a, 12b.

In the reproducing mode, the control unit 3-4 controls the respective timing signals between the DMA controller 10 and the HD controller 11, as shown in 17B.

Upon receipt of the request signal HDRQ (DREQ) from the HD controller 11, the control unit 3-4 outputs the acknowledge signal HDAK (DACK) to the HD controller 11. At the same time, the control unit 3-4 outputs an input enable signal to the input port switching unit 3-1 after causing the same unit 3-1 to select the data bus D 2. As a result, data is allowed to be actually transferred from the HD controller 11 to 9-3 to the filter unit 3-2.

Because of the similar reasons in the recording mode, the control unit 3-4 does; not output an output enable signal to the output port switching unit 3-3 and does not output the request signal DMARQ (DRQ 4) to the DMA controller 10, until data of 256 words are read out through the HD controller 11 from the hard disks 12a, 12b.

When, by repeatedly exchanging signals HDRQ (DREQ) and HDAK (DACK), digital audio data of 256 words are read out via the data bus D 2 from the HD controller 11, and the data are successively subjected to the filtering process by the filter unit 3-2 (S11 to S12), the control unit 3-4 outputs the request signal DMARQ (DRQ 4) to the DMA controller 10 (S12), and simultaneously outputs the output enable signal to the output port switching unit 3-3 after causing the unit 3-3 to select the data bus D 1. As a result, data is allowed to be actually transferred from the filter unit 3-2 to the DMA controller 10.

Thereafter, exchange of signals HDRQ (DREQ), HDAK (DACK) between the HD controller 11 and the control unit 3-4 (from S13, S14 to S15) as well as exchange of signals DMAK (DRQ 4), DMAAK (DAK 4) between the control unit 3-4 and the DMA controller 10 are repeatedly executed at the trigger of the DREQ (HDRQ) signal which is repeatedly generated by the HD controller 11. As a result, a transferring process is executed: reading process of data from the hard disks 12a, 12b to the HD controller 11, DMA transfer (block transfer) from the HD controller 11 to the filter unit 3-2; the filtering process by the filter unit 3-2; and DMA transfer (block transfer) of the filter output from the filter unit 3-2 to the buffers 9-1 to 9-3.

In the reproducing mode, as described above, the DSP 17 starts data transfer of the filter output to the buffers 9-1 to 9-3, immediately after the HD controller 11 repeatedly generates the request signal DREQ for 256 times, and digital audio data of 256 words (one sector) have been sent from the HD controller 11 to the DSP 17. Therefore, in order to transfer digital audio data of the number of words desired to be transferred from the DSP 17 to the buffers 9-1 to 9-3, the HD controller 11 is required to repeatedly output the DREQ signal for times corresponding to the number which is larger than the number of words desired to be transferred by the number of one sector (256 words).

Figure 18:
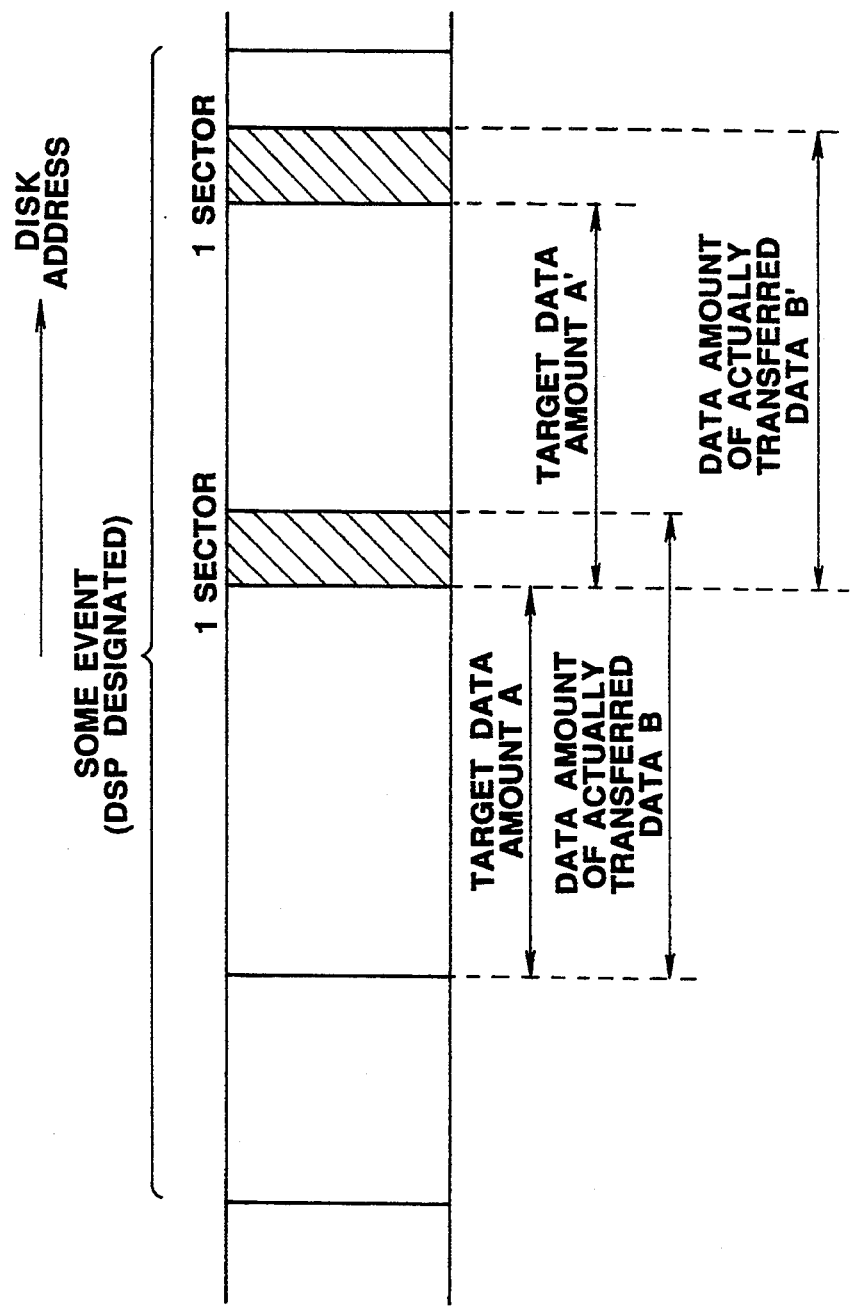
FIG. 18 is a view illustrating operation of DSP 17 in a reproducing mode.

Therefore, the data amount B or B', shown by slashed lines in FIG. 18, to be actually transferred in one DMA transfer (block transfer) by the HD controller 11 from the hard disks 12a, 12b to the DSP 17 is more than a target data amount A or A' to be finally transferred from the hard disks 12a, 12b to the buffers 9-1 to 9-3 by the one sector of words (256 words). In the following DMA transfer, data transfer will be executed from an address (left sides of the slashed portions) next to the final address of the target data amount A or A' (see 6—6 of FIG. 6).

In the adore mentioned embodiment, the DSP 17 provided between the DMA controller 10 and the HD controller 11 is arranged to execute the digital filtering process on digital audio data which is block-transferred (DMA transfer) thereto, but the functions of the DSP 17 of the present invention are not limited to the above. For example, if a DSP is arranged to perform a compression/expansion process on digital audio data in the recording/reproducing mode, the DSP can compress and store digital audio data in the hard disks 12a, 12b.

Several embodiments of the present invention have been described in detail but these embodiments are simply illustrative and not restrictive. The present invention may be modified in various ways that are readily apparent to one with ordinary skill in the art. All such modifications and applications of the present invention are intended to fall within the scope of the invention as defined by the following claims.

What is claimed is:

1. A digital recorder comprising:
   audio input/output means for executing input/output operation of digital audio data;
   audio storing means for storing digital audio data;
   buffer means for successively and temporarily storing digital audio data which are input to and/or output from said audio input/output means at predetermined sampling intervals;
   transfer control means for executing data transfer of the digital audio data between said buffer means and said audio input/output means in synchronism with the predetermined sampling intervals, and for executing data transfer of the digital audio data of several continuous samplings in a lump between said buffer means and said audio storing means while the data transfer between said buffer means and said audio input/output means is not being executed;
   reproduction schedule table means to store a reproduction schedule table for determining a reproducing order of digital audio data and including specifying means for specifying a digital signal process for respective digital audio data a reproducing order of which is determined by said reproduction schedule table, from among a plurality of digital signal processes; and
   signal processing means, provided on a pass for transferring the digital audio data between said buffer means and said audio storing means, for performing the specified digital signal process on the digital audio data of several continuous samplings in a lump which are transferred by said transfer control means between said buffer means and said audio storing means.

2. A digital recorder according to claim 1, wherein said transfer control means supplies the digital audio data to said signal processing means for subjecting the digital audio data to the specified digital signal process while the digital audio data is transferred from said buffer means to said audio storing means, when the digital audio data is input from said audio input/output means.

3. A digital recorder according to claim 1, wherein said transfer control means supplies the digital audio data to said signal processing means for subjecting the digital audio data to specified digital signal process while the digital audio data is transferred from said audio storing means to said buffer means, when the digital audio data is output from said audio input/output means.

4. A digital recorder according to claim 1, wherein said signal processing means performs on the digital audio data supplied thereto at least one of filtering operations including a low pass filtering operation, a band pass filtering operation and a high pass filtering operation specified by said specifying means.

5. A digital recorder according to claim 1, wherein said audio storing means is a disk memory medium of a random accessible type including a hard disk, an optical disk and a magneto-optical disk.

6. A digital recorder comprising:
a plurality of audio input/output means for executing audio input/output operation of digital audio signals corresponding to a plurality of tracks;
audio storing means for storing the digital audio data corresponding to the plurality of tracks;
a plurality of buffer means for successively and temporarily storing digital audio data track by track which are input to and/or output from said plurality of audio input/output means at predetermined sampling intervals;
transfer control means for executing data transfer of the digital audio data track by track between said plurality of buffer means and said plurality of audio input/output means in synchronism with the predetermined sampling intervals, and for executing data transfer of the digital audio data of several continuous samplings in a lump track by track between said plurality of buffer means and said audio storing means while the data transfer between said plurality of buffer means and said plurality of audio input/output means are not being executed;
reproduction schedule table means to store a reproduction schedule table for determining a reproducing order of digital audio data and including specifying means for specifying a digital signal process for respective digital audio data a reproducing order of which is determined by said reproduction schedule table, from among a plurality of digital signal processes for respective tracks; and
signal processing means, provided on passes for transferring the digital audio data between said plurality of buffer means and said audio storing means, for performing the specified digital signal process on the digital audio data of several continuous samplings in a lump track by track which are transferred by said transfer control means between said plurality of buffer means and said audio storing means.

7. A digital recorder according to claim 6, wherein said transfer control means supplies the digital audio data to said signal processing means for subjecting the specified digital audio data to the digital signal process while the digital audio data are transferred from said buffer means to said audio storing means, when the digital audio data are input from plurality of said audio input/output means.

8. A digital recorder according to claim 6, wherein said transfer control means supplies the digital audio data to said signal processing means for subjecting the digital audio data to the specified digital signal process while the digital audio data are transferred from said audio storing means to said buffer means, when the digital audio data are output from said plurality of audio input/output means.

9. A digital recorder according to claim 6, wherein said signal processing means performs digital signal processes specified by said specifying means for the respective tracks on the digital audio data which are supplied thereto.

10. A digital recorder according to claim 6, wherein said signal processing means performs on the digital audio data supplied thereto at least one of filtering operations including a low pass filtering operation, a band pass filtering operation and a high pass filtering operation.

11. A digital recorder according to claim 6, wherein said audio storing means is a disk memory medium of a random accessible type including a hard disk, an optical disk and a magneto-optical disk.

12. An apparatus comprising:
audio output means for outputting digital audio data;
audio storing means for storing digital audio data;
buffer mens for successively and temporarily storing digital audio data which are output to said audio output means at predetermined sampling intervals;
transfer control means for executing data transfer of the digital audio data between said buffer means and said audio output means in synchronism with the predetermined sampling intervals, and for executing data transfer of the digital audio data of several continuous samplings in a lump between said buffer means and said audio storing means while the data transfer between said buffer means and said audio output means is not being executed;
reproduction schedule table means to store a reproduction schedule table for determining a reproducing order of digital audio data and including specifying means for specifying a digital signal process for respective digital audio data a reproducing order of which is determined by said reproduction schedule table, from among a plurality of digital signal processes; and
signal processing means, provided on a pass for transferring the digital audio data between said buffer means and said audio storing means, for performing the specified digital signal process on the digital audio data of several continuous samplings in a lump which are transferred by said transfer control means between said buffer means and said audio storing means.

13. A digital recorder according to claim 12, wherein said signal processing means performs on the digital audio data supplied thereto at least one of filtering operations including a low pass filtering operation, a band pass filtering operation and a high pass filtering operation specified by said specifying means.

14. A digital recorder according to claim 12, wherein said audio storing means is a disk memory medium of a random accessible type including a hard disk, an optical disk and a magneto-optical disk.

15. A digital recorder comprising:

audio input/output means for executing input/output operation of digital audio data;

audio storing means for storing digital audio data;

event defining means for dividing digital audio data stored in said audio storing means into a plurality of events, and including reproduction schedule table means to store a reproduction schedule table for determining a reproducing order of said plurality of events, and including specifying means for specifying a digital signal process from among a plurality of digital signal processes to be performed on each of the events a reproducing order of which is determined by said reproduction schedule table;

buffer means for successively and temporarily storing digital audio data which are input to and/or output from said audio input/output means at predetermined sampling intervals;

transfer control means for executing data transfer of the digital audio data between said buffer means and said audio input/output means in synchronism with the predetermined sampling intervals, and for executing data transfer of the digital audio data of several continuous samplings in a lump between said buffer means and said audio storing means while the data transfer between said buffer means and said audio input/output means is not being executed; and signal processing means, provided on a pass for transferring the digital audio data between said buffer means and said audio storing means, for performing the digital signal processes specified for respective events by said event defining means on the digital audio data of several continuous samplings in a lump which are transferred by said transfer control means between said buffer means and said audio storing means.

16. An apparatus comprising:

audio output means for outputting digital audio data;

audio storing means for storing digital audio data;

event defining means for dividing digital audio data stored in said audio storing means into a plurality of events, and including reproduction schedule table means to store a reproduction schedule table for determining a reproducing order of said plurality of events, and including specifying means for specifying a digital signal process from among a plurality of digital signal processes to be performed on each of the events a reproducing order of which is determined by said reproduction schedule table;

buffer means for successively and temporarily storing digital audio data which are output to said audio output means at predetermined sampling intervals;

transfer control means for executing data transfer of the digital audio data between said buffer means and said audio output means in synchronism with the predetermined sampling intervals, and for executing data transfer of the digital audio data for several continuous samplings in a lump between said buffer means and said audio storing means while the data transfer between said buffer means and said audio output means are not being executed; and signal processing means provided on a pass for transferring the digital audio data between said buffer means and said audio storing means, for performing the digital signal processes specified for each of the events by said event defining means on the digital audio data for several continuous samplings in a lump which are transferred by said transfer control means between said buffer means and said audio storing means.

* * * * *